(12) United States Patent
Malinoski et al.

(10) Patent No.: US 8,916,270 B2
(45) Date of Patent: Dec. 23, 2014

(54) GLASS FILLED COPOLYMER PRODUCTS FOR THIN WALL AND HIGH SURFACE GLOSS ARTICLES

(75) Inventors: Jon Michael Malinoski, Evansville, IN (US); Thomas L. Evans, Mt. Vernon, IN (US)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/565,313

(22) Filed: Aug. 2, 2012

(65) Prior Publication Data

US 2013/0196131 A1     Aug. 1, 2013

Related U.S. Application Data

(60) Provisional application No. 61/514,808, filed on Aug. 3, 2011.

(51) Int. Cl.
| | |
|---|---|
| B32B 15/08 | (2006.01) |
| B32B 15/09 | (2006.01) |
| B32B 27/20 | (2006.01) |
| B32B 27/28 | (2006.01) |
| B32B 27/36 | (2006.01) |
| C08K 3/40 | (2006.01) |
| C08K 5/1515 | (2006.01) |
| C08K 7/14 | (2006.01) |
| C08L 69/00 | (2006.01) |
| C08L 63/00 | (2006.01) |
| C08J 5/08 | (2006.01) |
| C08F 220/32 | (2006.01) |
| C08L 33/06 | (2006.01) |

(52) U.S. Cl.
CPC ............. *C08L 69/005* (2013.01); *C08J 5/08* (2013.01); *C08K 3/40* (2013.01); *C08K 7/14* (2013.01); *C08L 63/00* (2013.01); *C08F 220/32* (2013.01); *C08L 33/068* (2013.01)
USPC ........... 428/412; 428/413; 428/426; 428/480; 524/847; 525/438; 525/439; 525/448; 525/463; 525/466; 525/469

(58) Field of Classification Search
None
See application file for complete search history.

(56) References Cited

U.S. PATENT DOCUMENTS

| | | | |
|---|---|---|---|
| 5,037,903 A | * | 8/1991 | Parker ........................... 525/438 |
| 5,106,904 A | | 4/1992 | Fontana et al. |
| 2009/0186966 A1 | | 7/2009 | Gallucci et al. |
| 2010/0168370 A1 | | 7/2010 | Hatano et al. |

FOREIGN PATENT DOCUMENTS

| | | |
|---|---|---|
| EP | 0452707 A1 | 10/1991 |
| GB | 2165253 A | 4/1986 |
| WO | 03066704 A1 | 8/2003 |

OTHER PUBLICATIONS

International Search Report; International Application No. PCT/US2012/049409; International Filing Date: Aug. 3, 2012; Date of Mailing: Nov. 2, 2012; 4 Pages.
Written Opinion of the International Searching Authority; International Application No. PCT/US2012/049409; International Filing Date: Aug. 3, 2012; Date of Mailing: Nov. 2, 2012; 8 Pages.

* cited by examiner

*Primary Examiner* — Michael J Feely
(74) *Attorney, Agent, or Firm* — Cantor Colburn LLP

(57) ABSTRACT

Disclosed are compositions, glass filled compositions, articles made therefrom, and processes for making articles therefrom. In an embodiment, a composition can comprise: one or more polycarbonates wherein at least one of the polycarbonates is a polyester-polycarbonate having at least one unit derived from sebacic acid and has a biocontent of at least 5 weight % based upon a total weight of the polyester-polycarbonate, determined according ASTM-D6866; a glass content of 10 weight % or greater based upon a total weight of the composition; and an epoxy resin. The composition has a melt volume rate of greater than 10.5 cm³/10 minutes at 300° C./1.2 kg according to ASTM-D1238-10. A part molded having a 0.8 mm thickness molded from the composition has a gloss value of 89 or higher at 60°, according to ASTM-D523.

57 Claims, 5 Drawing Sheets

FIG. 1

BPA + Decanedioic acid + PCP + Phosgene (plus solvent and catalyst) → C914089

| Trade Name | Chemical Name | Loading (wt%) | Residue in Resin |
|---|---|---|---|
| Sebacic Acid | Decanedioic Acid 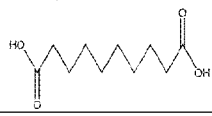 | 5 | <100 ppm |
| PCP | Paracumylphenol | 3 | <50 ppm |
| Phosgene | Carbonyl Chloride | 10*** | ND* |
| TEA | Triethylamine | 0.5% | <4 ppm |
| MeCl$_2$ | Methylene Chloride | - | <10 ppm |
| NaOH | Sodium Hydroxide | - | ND** |
| CCl4 | Carbon Tetrachloride | - | <100 ppb |
| NaCl | Sodium Chloride | - | 0.4-1 ppm |

\* - Phosgene is totally consumed in the reaction process. Excess phosgene converts to Na$_2$CO$_3$. Na$_2$CO$_3$ is not detected in the resin.
\*\* - Total sodium was analyzed and Na was not detected with an analytical method sensitive to 0.5 ppm.
\*\*\* - NaOH is added to neutralize HCl. The byproduct NaCl is measured in the resin. USL s 2.0 ppm for chloride.

FIG. 2

BPA + Decanedioic acid + PCP + Phosgene (plus solvent and catalyst) → C914090

| Trade Name | Chemical Name | Loading (wt%) | Residue in Resin |
|---|---|---|---|
| Sebacic Acid | Decanedioic Acid  | 7 | <100 ppm |
| PCP | Paracumylphenol | 2 | <50 ppm |
| Phosgene | Carbonyl Chloride | 10*** | ND* |
| TEA | Triethylamine | 0.5% | <4 ppm |
| MeCl$_2$ | Methylene Chloride | - | <10 ppm |
| NaOH | Sodium Hydroxide | - | ND** |
| CCl4 | Carbon Tetrachloride | - | <100 ppb |
| NaCl | Sodium Chloride | - | 0.4-1 ppm |

* - Phosgene is totally consumed in the reaction process. Excess phosgene converts to Na$_2$CO$_3$. Na$_2$CO$_3$ is not detected in the resin.
** - Total sodium was analyzed and Na was not detected with an analytical method sensitive to 0.5 ppm.
*** - NaOH is added to neutralize HCl. The byproduct NaCl is measured in the resin. USL s 2.0 ppm for chloride.

* - Unable to completely fill disc.

* - Unable to completely fill disc.

GLASS FILLED COPOLYMER PRODUCTS FOR THIN WALL AND HIGH SURFACE GLOSS ARTICLES

FIELD OF THE INVENTION

The present invention relates to the development and use of a glass-filled, high flow and high ductility copolymer for formation of thin wall articles that have high surface gloss.

BACKGROUND OF THE INVENTION

Fiber glass is commonly used as filler, or a reinforcing agent, in polycarbonates to improve stiffness (modulus) and dimensional stability (coefficient of thermal expansion). Typical glass fiber loadings in polycarbonates range from 5 to 50%. As the fiber glass content increases, the polycarbonate exhibits a decrease in melt flow characteristics and an increase in melt viscosity. As a result, it is difficult to generate thin-wall injection molded parts (thickness<1.0 mm) with these kinds of polycarbonate materials. In addition, increasing fiber glass content results in increased surface roughness and lower surface gloss in injection molded parts due to glass fibers breaking through the resin surface.

The use of fiber glass-filled polycarbonates in applications such as mobile phones and portable electronics housings is increasing as design trends move toward thinner wall housings and frames requiring higher stiffness materials. However, the relatively poor surface appearance in glass-filled polycarbonates limits their use in applications that require high surface gloss or a secondary painting or metallization step.

Based on these demands there exists a need for a high-flow glass-filled material to effectively fill a thin-wall article and obtain a high gloss surface to achieve a certain appearance or allow for a secondary paint or metallization step.

SUMMARY OF THE INVENTION

The present invention is directed to a blend composition comprising (a) one or more polycarbonates wherein at least one of the polycarbonates is a polyester-polycarbonate having at least one unit derived from sebacic acid and has a biocontent of at least 5 weight % based upon a total weight of the polyester-polycarbonate, determined according ASTM-D6866, (b) a glass content of 10% or greater, and (c) an epoxy resin. The composition has a melt volume rate of greater than 10.5 cm$^3$/10 minutes at 300° C./1.2 kg according to ASTM-D1238-10, and can impart a gloss value of 89 or higher at 60°, according to ASTM-D523, to a molded article having a 0.8 mm thickness. The composition may be derived from least one polyester-polycarbonate having (a) a weight average molecular weight of 34,000 to 39,000 Daltons as measured by gel permeation chromatography using BPA polycarbonate standards, and a sebacic acid content of 7.0 mole % to 9.0 mole %; or (b) a weight average molecular weight of 19,000 to 23,000 Daltons as measured by gel permeation chromatography using BPA polycarbonate standards, and a sebacic acid content of 5.0 mole % to 7.0 mole %. At least one of the polyester-polycarbonate of (a) may be at a weight average molecular weight of 36,500 Daltons as measured by gel permeation chromatography using BPA polycarbonate standards, and have a sebacic acid content of 8.25 mole %. At least one polyester-polycarbonate of (b) may be at a weight average molecular weight of 21,500 Daltons as measured by gel permeation chromatography using BPA polycarbonate standards, and have a sebacic acid content of 6.0 mole %. At least one of the polyester-polycarbonates may include less than 100 ppm sebacic acid monomer impurity, less than 4 ppm triethylamine impurity, less than 10 ppm methylene chloride impurity, and/or less than 100 ppb carbon tetrachloride impurity. The glass of the composition may be chopped glass such as Owen-Corning glass and may constitute 10 to 40% of the total composition. The composition may have a glass transition temperature of 130° C. to 147° C., or more specifically 135° C. The epoxy resin of the composition may be a hydrolytic stabilizer with multiple epoxy groups and may be an epoxy-functional styrene-(meth)acrylate copolymer with glycidyl groups (e.g., Joncryl ADR-4368CS). The composition may further comprise other additives such as heat stabilizers, mold release agents, impact modifiers, UV stabilizers, flame retardants, antistatic agents, anti-drip agents, blowing agents, radiation stabilizers and/or colorants. The blend polymer composition may impart on a molded article having a 0.8 mm thickness a 15% or greater improvement in gloss at 60° according to ASTM-D523 compared with an article made from BPA polycarbonate having the same glass loading and thickness, and molded using the same molding conditions. The blend polymer composition may impart on a 0.8 mm thickness article, molded using a double gated tensile bar mold, a 10% or greater improvement in Tensile Strength at the knit line of the molded article as compared with an article molded from BPA polycarbonate having the same glass loading and thickness, and molded using the same molding conditions. The blend polymer composition may impart on a 0.8 mm thickness article, molded using a doubled gated tensile bar mold, a 10% or greater improvement in Tensile Strength at Break at the knit line of the molded article as compared with an article made from BPA polycarbonate having the same glass loading and thickness, and molded using the same molding conditions.

The present invention is also directed to a composition comprising two or more polyester-polycarbonates, wherein the polyester-polycarbonates are derived from bis-phenol A and sebacic acid, and have a biocontent of at least 5 weight % based upon a total weight of the polyester-polycarbonate, determined according ASTM-D6866; a glass content of 10% or greater; and an epoxy resin, wherein the composition provides a melt volume rate of greater than 10.5 cm$^3$/10 minutes at 300° C./1.2 kg according to ASTM-D1238-10 and can impart a gloss value of 89 or higher at 60°, according to ASTM-D523, to a molded article having a 0.8 mm thickness. At least one of the two or more polyester-polycarbonate of the composition has (a) a weight average molecular weight of 34,000 to 39,000 Daltons as measured by gel permeation chromatography using BPA polycarbonate standards, and a sebacic acid content of 7.0 mole % to 9.0 mole %, or (b) a weight average molecular weight of 19,000 to 23,000 Daltons as measured by gel permeation chromatography using BPA polycarbonate standards, and a sebacic acid content of 5.0 mole % to 7.0 mole %. At least one copolycarbonate of (a) is at a weight average molecular weight of 36,500 Daltons as measured by gel permeation chromatography using BPA polycarbonate standards, and has a sebacic acid content of 8.25 mole %. At least one copolycarbonate of (b) is at a weight average molecular weight of 21,500 Daltons as measured by gel permeation chromatography using BPA polycarbonate standards, and has a sebacic acid content of 6.0 mole %.

The present invention may be directed to an article formed from the blend compositions wherein the article has the following characteristics: (a) at least one side with a thickness of less than 0.8 mm, (b) a UL flame rating of at least HB at 0.8 mm, and (c) a gloss value of 89 or higher at 60° on at least one side of the article with a thickness of less than 0.8 mm, wherein the article is formed by injection molding.

The present invention may be directed to an article formed from a polyester-polycarbonate with a gloss value of 89 or higher at 60°, according to ASTM-D523, wherein the article has at least one side with a thickness of at least 0.3 mm, a UL flame rating of at least HB at 0.8 mm, and a gloss of 89 or higher at 60° on at least one side with a thickness of at least 0.3 mm. The at least one side may have a thickness at least 0.3 mm to 0.8 mm, at least 0.3 mm and 0.5 mm, or at least 0.3 mm. The article may comprise the composition as described above. The article has a biocontent of at least 5 weight % based upon a total weight of the polyester-polycarbonate, determined according to ASTM-D6866. The article may be metalized and may be formed by vapor deposition or overmolding. The overmolded article may comprise a metal frame made from aluminum, tin, cobalt, stainless steel, iron, gold, platinum, and/or silver. The article may be an electrical component, a medical device component or a component of a meter system. The article may be a smart meter housing; a mobile phone, a camera, a camera/lens Mount including the inner parts of the camera and lens, a digital video, an electronic tablet, a hand receiver, an IC card case, a game device, a rice cooker, an electronic tablet, or a kitchen appliance.

The present invention may be directed to an article of manufacture produced by the process comprising the steps of (a) providing a blended composition comprising (i) one or more polyester-polycarbonates wherein at least one of the polyester-polycarbonates has at least some structural units derived from sebacic acid, (ii) a glass content of at least 10%, at least 25%, or greater, and (iii) an epoxy, (b) melting the blended copolymer of (a) of 250 to 310° C. in an extruder; (c) extruding the blended copolymer of step (b), and (d) isolating the blended copolymer such as by chopping, wherein the isolated blended composition has a glass transition temperature of 130° C. to 147° C., and a melt flow rate of greater than 12 cm$^3$/10 minutes at 300° C./1.2 kg according to ASTM-D and (e) forming the article form the isolated blended composition. The article of manufacture may further be produced by the steps of (f) drying the blended copolymer of (d), and (g) forming the article by molding the dry blended composition in an injection molder to form the article, wherein the article has at least one side with a thickness equal to or less than 0.8 mm, a UL flame rating of at least HB at 0.8 mm, and a gloss value of 89 or higher at 60° on at least one side of the article with a thickness of less than 0.8 mm and is injection molded at a temperature of 260° C. to 320° C.

The present invention is further directed to an injection molded article comprising (a) one or more polyester-polycarbonate wherein at least one of the polyester-polycarbonates has at least one unit derived from sebacic acid and has a biocontent of at least 5 weight % based upon a total weight of the polyester-polycarbonate, determined according ASTM-D6866, and (b) glass, wherein the article has (a) at least one side with a thickness of at least 0.8 mm, (b) a UL flame rating of at least HB at 0.8 mm; and (c) the gloss is on at least one side of the article with a thickness of less than 0.8 mm. The article has a biocontent of at least 5 weight % based upon a total weight of the resin portion of the article (e.g., excluding fillers and additives), determined according to ASTM-D6866. The article may be metalized and may be formed by vapor deposition or overmolding. The overmolded article may comprise a metal frame made from aluminum, tin, cobalt, stainless steel, iron, gold, platinum, and/or silver. The article may be an electrical component, a medical device component or a component of a meter system. The article may be a smart meter housing, a mobile phone, a camera, a camera/lens mount including the inner parts of the camera and lens, a digital video, an electronic tablet, a hand receiver, an IC card case, a game device, a rice cooker, an electronic tablet, or a kitchen appliance.

The present invention may further be a blend composition comprising (a) one or more polyester-polycarbonates wherein at least one of the polyester-polycarbonates is derived from sebacic acid and bisphenol A, and has a biocontent of at least 5 weight % based upon a total weight of the polyester-polycarbonate, determined according ASTM-D6866, (b) glass, and (c) an epoxy resin wherein the resin is Joncryl ADR-4368CS, wherein at least one polyester-polycarbonate has (a) a weight average molecular weight of 34,000 to 39,000 Daltons as measured by gel permeation chromatography using BPA polycarbonate standards, and a sebacic acid content of 7.0 mole % to 9.0 mole %, or (b) a weight average molecular weight of 19,000 to 23,000 Daltons as measured by gel permeation chromatography using BPA polycarbonate standards, and a sebacic acid content of 5.0 mole % to 7.0 mole %, wherein the glass is of 10 to 40% of the total composition, wherein the glass transition temperature is of 130° C. to 147° C., wherein the composition has a melt volume rate of greater than 10.5 cm$^3$/10 minutes at 300° C./1.2 kg according to ASTM-D1238-10, and can impart a gloss value of 89 or higher at 60°, according to ASTM-D523, to a molded article having a 0.8 mm in thickness. The glass may be fiber glass or chopped glass. The fiber glass may be at a diameter of 6 to 17 (μm) micrometers, and contain less than 100 parts per million of boron.

The present invention may further be directed to a blend composition comprising one or more polycarbonates wherein at least one of the polycarbonates is a polyester-polycarbonate having at least one unit derived from sebacic acid and has a biocontent of at least 5 weight % based upon a total weight of the polyester-polycarbonate, determined according ASTM-D6866, a filler, and an epoxy resin, wherein the composition has a melt volume rate of greater than 10.5 cm$^3$/10 minutes at 300° C./1.2 kg according to ASTM-D1238-10, and can impart a gloss value of 89 or higher at 60°, according to ASTM-D523, to a molded article having a 0.8 mm in thickness. The filler may be a glass fiber. The filler may be in an amount of 10 to 50%, or 10 to 40% based upon total weight of composition.

BRIEF DESCRIPTION OF THE DRAWINGS

FIG. 1 shows a list of example additional monomers and process chemicals for C914089.

FIG. 2 shows a list of example additional monomers and process chemicals for C914090.

DETAILED DESCRIPTION

Figure 3:
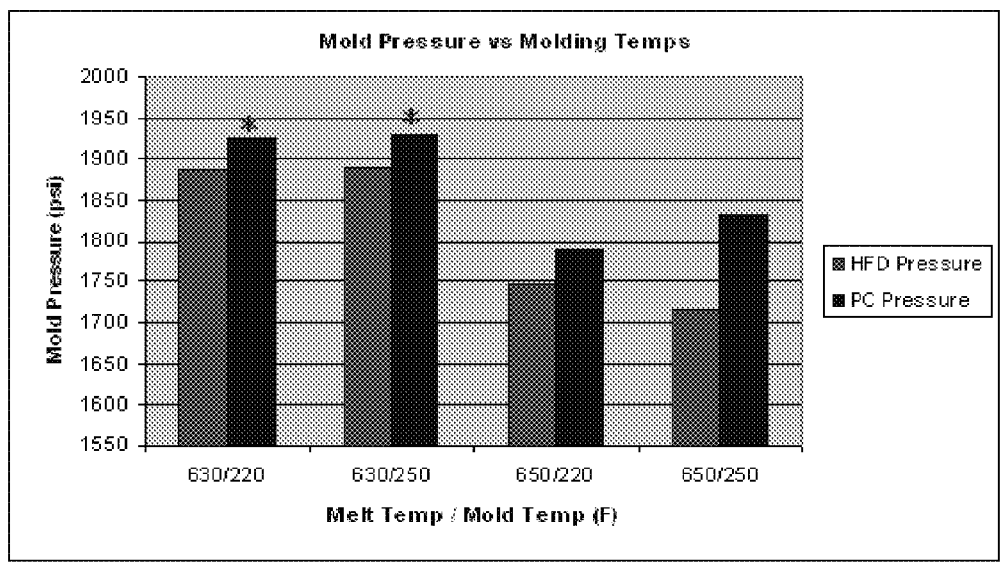
FIG. 3 shows results of an injection molding study using a 0.8 mm thickness×100 mm diameter circular disc tool.

Described herein is a high flow, ductile blend polymer composition that contains at least one or at least two sebacic acid derived polycarbonate copolymers, glass, and an epoxy resin. The sebacic acid derived polycarbonate copolymer is a polyester-polycarbonate. This composition may be in the form of a resin, which can be manufactured into thin-walled articles of less than 0.8 mm having a high gloss surface to achieve a particular eclectic appearance or allow a secondary paint or metallization step. The inventors have discovered that a sebacic acid derived copolycarbonate combined with glass, and an epoxy resin can impart desirable melt volume flow rates for formation of high gloss on articles molded from the composition. These molded articles may include very thin-walled metalized articles less than 0.8 mm as well as allow for secondary paint steps. Specifically, the composition has a melt volume rate of greater than 10.5 cm$^3$/10 minutes at 300° C./1.2 kg according to ASTM-D1238-10. The composition can impart of gloss value of 89 or higher at 60° C. according to ASTM-D523 to a molded article being 0.8 mm in thickness. Because sebacic acid is used in the polyester-polycarbonate, the overall biocontent of the composition may be 5 weight % or higher, based upon a total weight of the composition excluding fillers and additives, determined according to ASTM-D6866. The composition may further comprise other additives such as heat stabilizers, mold release agents, impact modifiers, UV stabilizers, flame retardants, antistatic agents, anti-drip agents, blowing agents, radiation stabilizers and/or colorants.

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Alkenyl" as used herein may be a straight or branched hydrocarbyl chain containing one or more double bonds. Each carbon-carbon double bond may have either cis or trans geometry within the alkenyl moiety, relative to groups substituted on the double bond carbons. Non-limiting examples of alkenyl groups include ethenyl (vinyl), 2-propenyl, 3-propenyl, 1,4-pentadienyl, 1,4-butadienyl, 1-butenyl, 2-butenyl, and 3-butenyl.

"Alkenylene" as used herein may be a divalent unsaturated hydrocarbyl chain which may be linear or branched and which has at least one carbon-carbon double bond. Non-limiting examples of alkenylene groups include —C(H)═C(H)—, —C(H)═C(H)—CH$_2$—, —C(H)═C(H)—CH$_2$—CH$_2$—, —CH$_2$—C(H)═C(H)—CH$_2$—, —C(H)═C(H)—CH(CH$_3$)—, and —CH$_2$—C(H)═C(H)—CH(CH$_2$CH$_3$)—.

"Antistatic agent" as used herein may be a monomeric, oligomeric, or polymeric material that can be processed into polymer resins and/or sprayed onto materials or articles to improve conductive properties and overall physical performance. These monomeric, oligomeric, or polymeric materials may also be used as additives.

"Biocontent" as used herein may mean a polymer or composition containing a polymer derived, at least in part, from biologically-based molecular units. The biologically-based unit may be a biologically-derived monomer. The biologically based monomer may be derived from a plant, for example. The plant may be any plant, such as a starch-based plant, castor bean, palm oil, vegetable oil, sugar cane, corn, rice, switch-grass, etc. The biologically-based unit may be isosorbide, sebacic acid, azelaic acid, etc.

"Chemical vapor deposition" as used herein may mean a chemical process used to produce high-purity, high-performance solid materials. The process is often used in the semiconductor industry to produce thin films. In a typical CVD process, the wafer (substrate) is exposed to one or more volatile precursors, which react and/or decompose on the substrate surface to produce the desired deposit. Frequently, volatile by-products are also produced, which are removed by gas flow through the reaction chamber. Microfabrication processes widely use CVD to deposit materials in various forms, including: monocrystalline, polycrystalline, amorphous, and epitaxial. These materials include: silicon, carbon fiber, carbon nanofibers, filaments, carbon nanotubes, SiO$_2$, silicon-germanium, tungsten, silicon carbide, silicon nitride, silicon oxynitride, titanium nitride, and various high-k dielectrics. The CVD process is also used to produce synthetic diamonds "Copolymer" as used herein may mean a polymer derived from two or more structural unit or monomeric species, as opposed to a homopolymer, which is derived from only one structural unit or monomer.

"C3-C6 cycloalkyl" as used herein may mean cyclopropyl, cyclobutyl, cyclopentyl and cyclohexyl.

"Glass Transition Temperature" or "Tg" as used herein may mean the maximum temperature that a polycarbonate will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polycarbonate may depend primarily on the composition of the polycarbonate. Polycarbonates that are formed from monomers having more rigid and less flexible chemical structures than Bisphenol-A generally have higher glass transition temperatures than Bisphenol-A polycarbonate, while polycarbonates that are formed from monomers having less rigid and more flexible chemical structures than Bisphenol-A generally have lower glass transition temperatures than Bisphenol-A polycarbonate. For example, a polycarbonate described herein formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate described herein formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of the corresponding polycarbonate and polycarbonate blends. The Tg can be determined by differential scanning calorimetry. The calorimetry method may use a TA Instruments Q1000 instrument, for example, with a setting of 20° C./min ramp rate and 40° C. start temperature and 200° C. end temperature "Gloss" as defined herein is an optical property of a surface, which is based on the interaction of light with physical characteristics with the surface. It is actually the ability of a surface to reflect light into the specular direction. The factors that affect gloss are the refractive index of the material, the angle of incident light, and the surface topography. Gloss is the view of material appearance. Materials with smooth surfaces appear glossy, while very rough surfaces reflect no specular light and therefore have a matte appearance. Gloss is also expressed as lustre in mineralogy, or sheen in certain fields of application. Surface gloss is considered to be the amount of incident light that is reflected at the specular reflectance angle of the mean of that surface. Specular gloss is proportional to the reflectance of the surface. The Fresnel formula gives the specular reflectance, $R_s$, for an unpolarized light of intensity $I_0$, at angle of incidence i, giving the intensity of specularly reflected beam of intensity $I_r$, while the refractive index of the surface specimen is m.

The Fresnel equation is a follows: $R_s = I_r/I_o$ $$R_s = \frac{1}{2}\left[\left(\frac{\cos i - \sqrt{m^2 - \sin^2 i}}{\cos i + \sqrt{m^2 - \sin^2 i}}\right)^2 + \left(\frac{m^2 \cos i - \sqrt{m^2 - \sin^2 i}}{m^2 \cos i + \sqrt{m^2 - \sin^2 i}}\right)^2\right]$$

Specular reflection is measured with a specular gloss meter, and reported in gloss units. Unpolarized white light is concentrated by a condenser lens onto a field aperture, which is located in the focal plane of the source lens. The reflected beam at the surface is later collected by the receptor lens. The intensity of the beam is then measured through a photodetector. The common angles of incidence for gloss measurement may be 20°, 60°, and 85°. In some cases 45° and 75° geometry may be used. Low gloss surfaces are recommended to be measured with 85° settings. The typical standards for gloss measurements are ASTM D523.

"Halo" as used herein may be a substituent to which the prefix is attached is substituted with one or more independently selected halogen radicals. For example, "C1-C6 haloalkyl" means a C1-C6 alkyl substituent wherein one or more hydrogen atoms are replaced with independently selected halogen radicals. Non-limiting examples of C1-C6 haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Heteroaryl" as used herein may mean any aromatic heterocyclic ring which may comprise an optionally benzocondensed 5 or 6 membered heterocycle with from 1 to 3 heteroatoms selected among N, O or S, Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"(Meth)acrylic acid" includes both acrylic and methacrylic acid monomers.

"(Meth)acrylate" includes both acrylate and methacrylate monomers.

"Melt Volume Rate" (MVR) as used herein may measure the rate of extrusion of a thermoplastic through an orifice at a prescribed temperature and load. The MVR measurement is flow rate of a polymer in a melt phase as determined using the method of ASTM-D1238-10. The MVR of a molten polymer is measured by determining the amount of polymer that flows through a capillary of a specific temperature over a specified time using standard weights at a fixed temperature. MVR is expressed in cubic centimeters per 10 minutes at a particular temperature per weight value. MVR may be measured according to the method of ASTM-D1238-10 at 1.2 kilogram at 300° C. The higher the MVR value of a polymer at a specific temperature, the greater the flow of that polymer at that specific temperature.

"Non-conducting vacuum metallization" as used herein may mean applying a metallic coating material over an article in a vacuum chamber. The coating material that is being applied is then heated until it starts to evaporate, this vaporized metal condenses on the article as a thin metallic film creating uniformity in the coat.

"PETS release agent" as used herein may mean pentaerythritol tetrastearate, mold release.

"Phosphite stabilizer" as used herein may mean tris-(2,4-di-tert-butylphenyl) phosphite.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

"Substituted" as used herein may mean that any at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

1. High Melt Flow, High Gloss Blend Polymer Composition

The present invention is directed to a high melt flow, high gloss blend polymer composition comprising a combination of one or more polycarbonates, glass, and an epoxy resin. At least one polycarbonate of the composition is a polyester-polycarbonate copolymer having at least one unit derived from sebacic acid.

The blend polymer composition may have a melt volume rate (MVR) of 1 to 25, 3 to 20, 5 to 15, 7.5 to 13, 9 to 12, 10.5 to 11.5 $cm^3$/10 minutes at 300° C./1.2 kg according to ASTM-D1238-10. The blend polymer composition may have a melt volume rate (MVR) of greater than 10.5 $cm^3$/10 minutes at 300° C./1.2 kg according to ASTM-D1238-10.

The blend polymer composition may impart on a molded article a high gloss value. The blend polymer composition may impart a gloss value of 85, 86, 87, 88, 89, 90, 91, 92, 93, 94, 95, 96, 97, 98, 99, 100 or higher at 60°, according to ASTM-D523, to an article having a thickness equal to or less than 1.2 mm, equal to or less than 1.1 mm, equal to or less than 1.0 mm, equal to or less than 0.9 mm, equal to or less than 0.8 mm, equal to or less than 0.7 mm, equal to or less than 0.6 mm, equal to or less than 0.5 mm, equal to or less than 0.4 mm, or equal to or less than 0.3 mm. The blend polymer composition may impart a gloss value of 87 or higher at 60°, according to ASTM-D523, to an article having a thickness equal to or less than 0.8 mm or at least one side of the article having a thickness equal to or less than 0.8 mm. The blend polymer composition may impart a gloss value of 88 or higher at 60°, according to ASTM-D523, to an article having a thickness equal to or less than 0.8 mm or at least one side of the article having a thickness equal to or less than 0.8 mm. The blend polymer composition may impart a gloss value of 89 or higher at 60°, according to ASTM-D523, to an article having a thickness equal to or less than 0.8 mm or at least one side of the article having a thickness equal to or less than 0.8 mm. The blend polymer composition may impart a gloss value of 90 or higher at 60°, according to ASTM-D523, to an article having a thickness equal to or less than 0.8 mm mat least one side of the article having a thickness equal to or less than 0.8 mm.

The blend polymer composition may impart on a molded article having a thickness of equal to or less than 0.8 mm, a 10%, 15%, 20%, 25%, 30%, 35%, 40% or greater improvement in gloss at 60° according to ASTM-D523 compared with an article made from BPA polycarbonate having the same glass loading and thickness, and molded using the same molding conditions. The blend polymer composition may impart on a molded article having a thickness of equal to or less than 0.8 mm, a 10%, 15%, 20%, 25%, 30%, 35%, 40% or greater improvement in Tensile Elongation at Break compared with an article made from BPA polycarbonate having the same glass loading and thickness, and molded using the same molding conditions. The blend polymer composition may impart on a molded article having a thickness of equal to or less than 0.8 mm, a 5%, 10%, 15% or greater improvement in Tensile Strength at Break compared with an article made from BPA polycarbonate having the same glass loading and thickness, and molded using the same molding conditions.

The blend polymer composition may have a glass transition temperature (Tg) of 130° C. to 147° C., of 132° C. to 145° C., of 133° C. to 142° C., of 34° C. to 139° C., or of 135° C. to 137° C. as measured using differential scanning calorimetry. The blend polymer composition may have a glass transition temperature of 135° C.

The blended polymer may have a biocontent according to ASTM-D-6866 of at least: 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight %, or at least 65 weight % of the composition derived therefrom. The polymer, or any composition derived therefrom, may have at least 5.0 weight % of sebacic acid content.

a. Polycarbonate

The blend polymer composition comprises a combination or one or more polycarbonates. "Polycarbonates" and "polycarbonate resins" may include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate.

(1) Homopolycarbonate/Copolycarbonate

The polycarbonate may be a homopolycarbonate or a copolycarbonate. The term "polycarbonate" and "polycarbonate resin" mean compositions having repeating structural carbonate units of the formula (1):

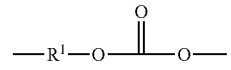
(1)

wherein at least about 60 percent of the total number of $R^1$ groups may contain aromatic organic groups and the balance thereof are aliphatic or alicyclic, or aromatic groups. $R^1$ in the carbonate units of formula (1) may be a $C_6$-$C_{36}$ aromatic group wherein at least one moiety is aromatic. Each $R^1$ may be an aromatic organic group, for example, a group of the formula (2):

$$-A^1-Y^1-A^2- \qquad (2)$$

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$)—, —C(O)—, methylene, cyclohexyl-methylene, 2[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexylylidene, or isopropylidene.

The polycarbonates may be produced from dihydroxy compounds having the formula HO—$R^1$—OH, wherein $R^1$ is defined as above for formula (1). The formula HO—$R^1$—OH includes bisphenol compounds of the formula (3):

$$HO-A^1-Y^1-A^2-OH \qquad (3)$$

wherein $Y^1$, $A^1$, and $A^2$ are as described above. For example, one atom may separate $A^1$ and $A^2$. Each $R^1$ may include bisphenol compounds of the general formula (4):

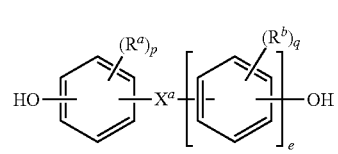
(4)

wherein $X_a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —S—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. $R^a$ and $R^b$ may each represent a halogen, $C_{1-12}$ alkyl group or combination thereof. For example, $R^a$ and $R^b$ may each be a $C_{1-3}$ alkyl group, specifically methyl, disposed meta to the hydroxy group on each arylene group. The designation (e) is 0 or 1. The numbers p and q are each independently integers of 0 to 4. It will be understood that le is hydrogen when p is 0, and likewise $R^b$ is hydrogen when q is 0.

$X_a$ may be substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (5):

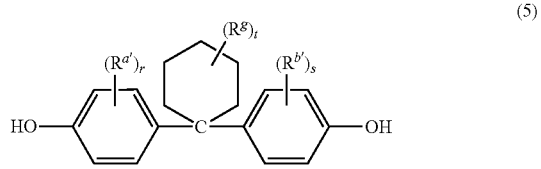

(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^{a'}$, $R^{b'}$ and $R^g$ may be each independently $C_1$-$C_4$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC* trade name.

$X_a$ may be a $C_{1-18}$ alkylene group, a $C_{3-18}$ cycloalkylene group, a fused $C_{6-18}$ cycloalkylene group, or a group of the formula —$B_1$—W—$B_2$—, wherein $B_1$ and $B_2$ are the same or different $C_{1-6}$ alkylene group and W is a $C_{3-12}$ cycloalkylidene group or a $C_{6-16}$ arylene group.

In another example, $X_a$ may be a substituted $C_{3-18}$ cycloalkylidene of the formula (6):

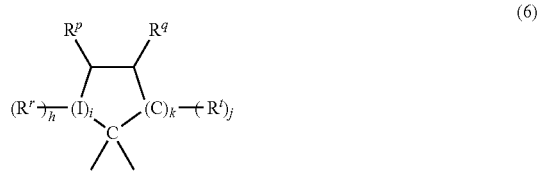

(6)

wherein $R^r$, $R^p$, $R^q$ and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When i is 0, h is 0, and k is 1, the ring as shown in formula (6) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (3) may include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may be the following formula (8):

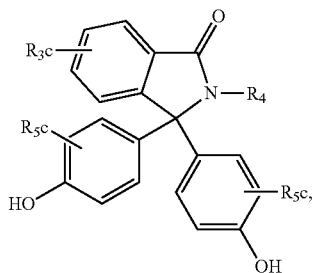

(8)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The dihydroxy compounds of formula (3) may be the following formula (9):

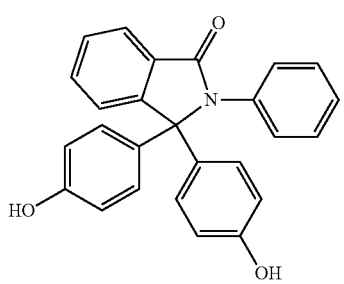

(9)

(also known as 3,3-bis(4-hydroxyphenyl)-2-phenylisoindolin-1-one (PPPBP)).

Alternatively, the dihydroxy compounds of formula (3) may be the following formula (10):

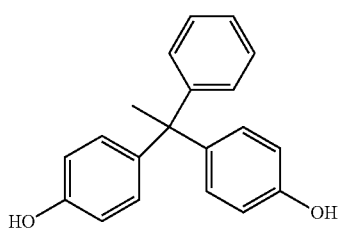

(10)

(also known as 4,4'-(1-phenylethane-1,1-diyl)diphenol (bisphenol AP) or 1,1-bis(4-hydroxyphenyl)-1-phenylethane).

Alternatively, the dihydroxy compounds of formula (3) may be the following formula (11):

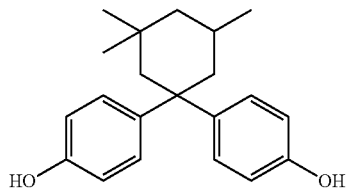 [SMILES: CC1CC(C)(C)CC(c2ccc(O)cc2)(c2ccc(O)cc2)C1]

4,4'-(3,3,5-trimethylcyclohexane-1,1-diyl)diphenol

(11) (bisphenol TMC) or 1,1-bis(4-hydroxyphenyl)-3,3,5-trimethylcyclohexane). Exemplary copolymers containing carbonate units may be derived from bisphenol A. A polyester-polycarbonate as described below way can also be used that contains units derived from a mixture of bisphenol A and PBPP, in a molar ratio of BPA:PBPP of 10:90 to 90:10, specifically 15:85 to 85:15.

(2) Polyester-Polycarbonates

The polycarbonate may be a copolymer comprising homopolycarbonate units as described above in (1) and other types of polymer units such as polyester units. A specific type of copolymer may be a polyestercarbonate, also known as a polyester-polycarbonate. As used herein, these terms are synonymous. The composition may comprise at least one or least two polyester-polycarbonates. Such copolymers further contain, in addition to recurring carbonate chain units of the formula (1) as described above, repeating ester units of formula (12):

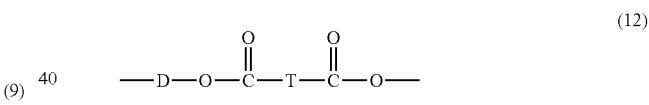

(12)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms. D may be a $C_{2-30}$ alkylene group having a straight chain, branched chain, or cyclic (including polycyclic) structure. O-D-O may be derived from an aromatic dihydroxy compound of formula (3) above. O-D-O may be derived from an aromatic dihydroxy compound of formula (4) above. O-D-O may be derived from an aromatic dihydroxy compound of formula (7) above.

The molar ratio of ester units to carbonate units in the copolymers may vary broadly, for example 1:99 to 99:1, specifically 10:90 to 90:10, more specifically 25:75 to 75:25, expand depending on the desired properties of the final composition.

T of formula (12) may be a divalent group derived from a dicarboxylic acid, and may be, for example, a $C_{2-10}$ alkylene group, a $C_{6-70}$ alicyclic group, a $C_{6-20}$ alkyl aromatic group, a $C_{6-20}$ aromatic group, or a $C_6$ to $C_{36}$ divalent organic group derived from a dihydroxy compound or chemical equivalent thereof. T may be an aliphatic group, wherein the molar ratio of carbonate units of formula (1) to ester units of formula (12) in the polyester-polycarbonate copolymer is from 99:1 to 60:40; and 0.01 to 10 weight percent, based on the total weight of the polymer component, of a polymeric containing compound. T may be derived from a $C_6$-$C_{20}$ linear aliphatic alpha-omega (α-ω) dicarboxylic ester.

Diacids from which the T group in the ester unit of formula (12) is derived include aliphatic dicarboxylic acid from 6 to about 36 carbon atoms, optionally from 6 to 20 carbon atoms. The $C_6$-$C_{20}$ linear aliphatic alpha-omega (α-ω) dicarboxylic acids may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids.

Saturated aliphatic alpha-omega dicarboxylic acids may be adipic, sebacic or dodecanedioic acid. Sebacic acid is a dicarboxylic acid having the following formula (13):

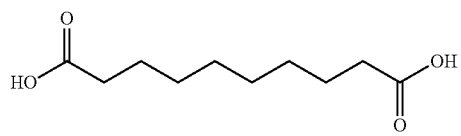

(13)

Sebacic acid has a molecular mass of 202.25 g/mol, a density of 1.209 g/cm³ (25° C.), and a melting point of 294.4° C. at 100 mmHg. Sebacic acid is extracted from castor bean oil found in naturally occurring castor beans.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98

D of the polyester-polycarbonate may also be a $C_{2-6}$ alkylene group and T may be p-phenylene, m-phenylene, naphthalene, a divalent cycloaliphatic group, or a combination thereof. This class of polyester includes the poly(alkylene terephthalates).

Mixtures of the diacids can also be employed. It should be noted that although referred to as diacids, any ester precursor could be employed, such as acid halides, specifically acid chlorides, and diaromatic esters of the diacid such as diphenyl, for example the diphenylester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester-polycarbonate may have a biocontent according to ASTM-D-6866 of at least: 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight % or at least 65 weight % of the composition derived therefrom. The biocontent is less than 100 wt % of the composition derived therefrom. The polyester-polycarbonate may have a biocontent according to ASTM-D-6866 of at least 5 weight % based upon a total weight of the polyester-polycarbonate. The polymer, or any composition derived therefrom, may have at least 5.0 weight % of sebacic acid content, based upon a total weight of the polymer.

(a) Sebacic acid Containing Polyester-Polycarbonate Copolymer

The polyester-polycarbonate copolymer may be derived from sebacic acid. At least one or two polyester-polycarbonates derived from sebacic acid may be present in the composition. Overall at least one polyester-polycarbonate copolymer may have a weight average molecular weight of 30,000 to 45,000 Daltons as measured by gel permeation chromatography using BPA polycarbonate standards, and a sebacic acid content of 7.0 mole % to 12.0 mole % sebacic acid. At least one, polyester-polycarbonate copolymer may have a weight average molecular weight of 32,000 to 40,000 Daltons as measured by gel permeation chromatography using BPA polycarbonate standards, and a sebacic acid content of 7.0 mole % to 10.0 mole %. At least one polyester-polycarbonate copolymer may have a weight average molecular weight of 34,000 to 39,000 Daltons as measured by gel permeation chromatography using BPA polycarbonate standards, and a sebacic acid content of 7.0 mole % to 9.0 mole %. At least one polyester-polycarbonate copolymer may have a weight average molecular weight of 35,000 to 38,000 Daltons as measured by gel permeation chromatography using BPA polycarbonate standards, and a sebacic acid content of 7.75 mole % to 8.75 mole %. At least one polyester-polycarbonate copolymer may have a weight average molecular weight of 36,500 Daltons as measured by gel permeation chromatography using BPA polycarbonate standards, and a sebacic acid content of 8.25 mole %.

At least one polyester-polycarbonate copolymer may have a weight average molecular weight of 15,000 to 28,000 Daltons as measured by gel permeation chromatography using BPA polycarbonate standards, and a sebacic acid content of 3.0 mole % to 7.0 mole %. At least one polyester-polycarbonate copolymer may have a weight average molecular weight of 17,000 to 25,500 Daltons as measured by gel permeation chromatography using BPA polycarbonate standards, and a sebacic acid content of 4.0 mole % to 7.0 mole %. At least one polyester-polycarbonate copolymer may have a weight average molecular weight of 19,000 to 23,000 Daltons as measured by gel permeation chromatography using BPA polycarbonate standards, and a sebacic acid content of 5.0 mole % to 7.0 mole %. At least one polyester-polycarbonate copolymer may have a weight average molecular weight of 20,000 to 22,000 Daltons as measured by gel permeation chromatography using BPA polycarbonate standards, and a sebacic acid content of 5.5 mole % to 6.5 mole %. At least one polyester-polycarbonate copolymer may have a weight average molecular weight of 21,500 Daltons as measured by gel permeation chromatography using BPA polycarbonate standards, and a sebacic acid content of 6.0 mole %. Overall, the polyester-polycarbonate copolymer may contain 1-10 mole % sebacic acid, 2-9 mole %, 3-8 mole %, 4-7 mole %, or 5-7 mole %. The polyester-polycarbonate copolymer may contain 1.0 mole %, 2.0 mole %, 3.0 mole %, 4.0 mole %, 5.0 mole %, 6.0 mole %, 7.0 mole %, 8.0 mole %, 9.0 mole %, 10.0 mole %, 11.0 mole %, 12.0 mole %, 13.0 mole %, 14.0 mole %, or 15.0 mole % sebacic acid.

In one form, the polyester-polycarbonate copolymer may be derived from the reaction of sebacic acid with bisphenol A. Sebacic acid/BPA containing polyester-polycarbonate copolymer has the following formula (14):

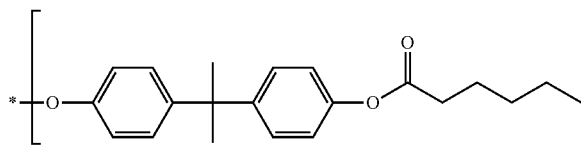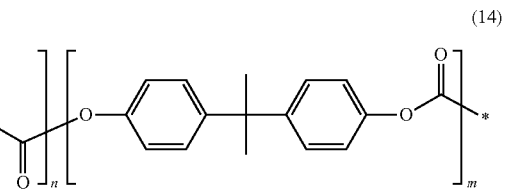

(14)

The sebacic acid/BPA containing copolymer may have a low molecular weight at 21 kMw and a sebacic acid content at 6.0 mol % sebacic acid. The sebacic acid/BPA containing copolymer may have a high molecular weight at 36.5 kMw and a sebacic acid content at 8.5 mol % sebacic acid.

Overall at least one polyester-polycarbonate copolymer may have a weight average molecular weight of 30,000 to 45,000 Daltons as measured by gel permeation chromatography using BPA polycarbonate standards, and a sebacic acid content of 7.0 mole % to 12.0 mole %. At least one polyester-polycarbonate copolymer may have a weight average molecular weight of 32,000 to 40,000 Daltons as measured by gel permeation chromatography using BPA polycarbonate standards, and a sebacic acid content of 7.0 mole % to 10.0 mole %. At least one polyester-polycarbonate copolymer may have a weight average molecular weight of 34,000 to 39,000 Daltons as measured by gel permeation chromatography using BPA polycarbonate standards, and a sebacic acid content of 7.0 mole % to 9.0 mole %. At least one polyester-polycarbonate copolymer may have a weight average molecular weight of 35,000 to 38,000 Daltons as measured by gel permeation chromatography using BPA polycarbonate standards, and a sebacic acid content of 7.75 mole % to 8.75 mole %. At least one polyester-polycarbonate copolymer may have a weight average molecular weight of 36,500 Daltons as measured by gel permeation chromatography using BPA polycarbonate standards, and a sebacic acid content of 8.25 mole %.

At least one polyester-polycarbonate copolymer may have a weight average molecular weight of 15,000 to 28,000 Daltons as measured by gel permeation chromatography using BPA polycarbonate standards, and a sebacic acid content of 3.0 mole % to 7.0 mole %. At least one polyester-polycarbonate copolymer may have a weight average molecular weight of 17,000 to 25,500 Daltons as measured by gel permeation chromatography using BPA polycarbonate standards, and a sebacic acid content of 4.0 mole % to 7.0 mole %. At least one polyester-polycarbonate copolymer may have a weight average molecular weight of 19,000 to 23,000 Daltons as measured by gel permeation chromatography using BPA polycarbonate standards, and a sebacic acid content of 5.0 mole % to 7.0 mole %. At least one polyester-polycarbonate copolymer may have a weight average molecular weight of 20,000 to 22,000 Daltons as measured by gel permeation chromatography using BPA polycarbonate standards, and a sebacic acid content of 5.5 mole % to 6.5 mole %. At least one polyester-polycarbonate copolymer may have a weight average molecular weight of 21,500 Daltons as measured by gel permeation chromatography using BPA polycarbonate standards, and a sebacic acid content of 6.0 mole %.

The sebacic acid derived polyester-polycarbonate may have a biocontent according to ASTM-D-6866 of at least 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight % or at least 65 weight % based upon a total weight of the polyester-polycarbonate. The polyester-polycarbonate may have a biocontent according to ASTM-D-6866 of at least 5 weight %. The polymer, or any composition derived therefrom, may have at least 5.0% weight percent of sebacic acid content.

(b) Level of Carboxylic Anhydride Groups

The polyester-polycarbonate copolymers should have a low level of carboxylic anhydride groups. Anhydride groups are where two aliphatic diacids, or chemical equivalents, react to form an anhydride linkage. The amount of carboxylic acid groups bound in such anhydride linkages should be less than 10 mole % of the total amount of carboxylic acid content in the copolymer. In other embodiments, the anhydride content should be less than 5 mole % of carboxylic acid content in the copolymer, and in yet other embodiments, the carboxylic acid content in the copolymer should be less than 2 mole %. Low levels of anhydride groups can be achieved by known methods, for example conducting an interfacial polymerization reaction of dicarboxylic acid, bisphenol and phosgene initially at a low pH (from about 4 to 6) to get high incorporation of the diacid in the polymer, and then after a proportion of the monomer has been incorporated into the growing polymer chain, switching to a high pH (from about 10 to 11) to convert any anhydride groups into ester linkages. Anhydride linkages can be determined by numerous methods known in the art, for instance proton NMR analyses showing signal for the hydrogens adjacent to the carbonyl group. In an embodiment, the polyester-polycarbonate copolymer has a low amount of anhydride linkages, such as less than 5 mole %, less than 3 mole %, specifically less than 2 mole %, and more specifically less than 1 mole %, as determined by proton NMR analysis. Low amounts of anhydride linkages in the polyester-polycarbonate copolymer contributes to superior melt stability in the copolymer, as well as other desirable properties.

(3) Polycarbonate Polysiloxane Copolymers

The polycarbonate may be a copolymer comprising homopolycarbonate units as described above in (1) and other types of polymer units such as polysiloxane units. The polycarbonate structural unit of the polycarbonate-polysiloxane copolymer may be derived from carbonate units of formula (1) as described above. The carbonate units may be derived from one or more dihydroxy monomers of formula (3) including bisphenol compound of formula (4), both as described and incorporated herein from above. The dihydroxy compound may be bisphenol-A.

The polysiloxane structural unit may be derived from a siloxane-containing dihydroxy compounds (also referred to herein as "hydroxyaryl end-capped polysiloxanes") that contains diorganosiloxane units blocks of formula (15):

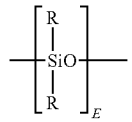
(15)

wherein each occurrence of R is same or different, and is a $C_{1-13}$ monovalent organic group. For example, R can be a $C_1$-$C_{13}$ alkyl group, $C_1$-$C_{13}$ alkoxy group, $C_{1-13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent polycarbonate is desired, R does not contain any halogen. Combinations of the foregoing R groups can be used in the same polycarbonate.

The value of E in formula (15) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (16):

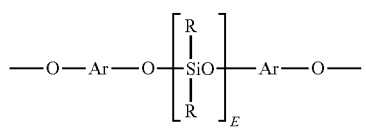
(16)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. —O—Ar—O— groups in formula (16) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)pro- pane, 1,1-bis(4-hydroxyphenyl)cyclohexane, bis(4-hydroxyphenyl sulfide), 1,1-bis(4-hydroxy-3-methylphenyl) cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (17):

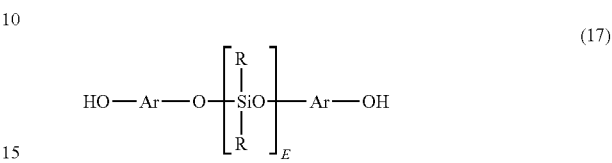
(17)

wherein Ar and E are as described above. Compounds of formula (17) can be obtained by the reaction of a dihydroxyaromatic compound with, for example, an alpha, omega-bis-acetoxy-polydiorganosiloxane oligomer under phase transfer conditions. Compounds of formula (17) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (18):

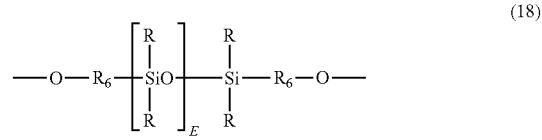
(18)

wherein R and E are as described above, and each $R_6$ is independently a divalent $C_1$-$C_{30}$ organic group such as a $C_1$-$C_{30}$ alkyl, $C_1$-$C_{30}$ aryl or $C_1$-$C_{30}$ alkylaryl. The polysiloxane blocks corresponding to formula (18) are derived from the corresponding dihydroxy compound of formula (19):

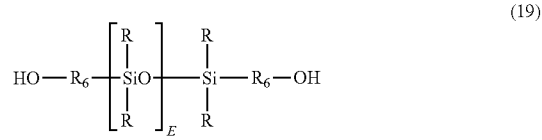
(19)

wherein R, E, and $R_6$ are as described for formula (18).

In a specific embodiment, the polycarbonate comprises carbonate units derived from a polysiloxane monomer having the structure (20):

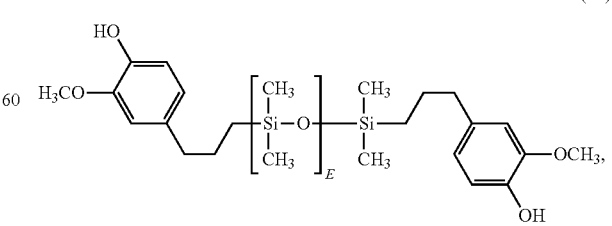
(20)

wherein E is an average value of 20 to 75.

In another specific embodiment the second polycarbonate comprises carbonate units derived from a polysiloxane monomer having the structure (21):

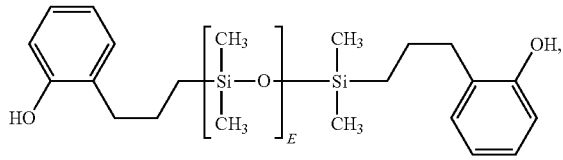

(21)

wherein E is an average value of 20 to 75.

In a specific embodiment, the polydiorganosiloxane blocks are provided by repeating structural units of formula (22)

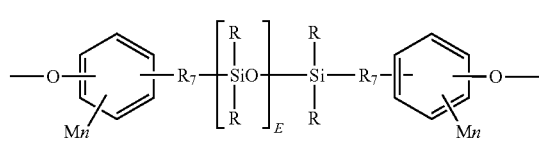

(22)

wherein R and E are as defined above. $R_7$ in formula (22) is a divalent $C_2$-$C_8$ aliphatic group. Each M in formula (22) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{13}$, alkylaryl, or $C_7$-$C_{12}$ alkylaryloxy, wherein each n is independently 0, 1, 2, 3, or 4.

In one embodiment, M of formula (22) is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R_7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment. M is methoxy, n is one, $R_7$ is a divalent $C_1$-$C_3$ aliphatic group, and R is methyl.

Polysiloxane-polycarbonates comprising units of formula (22) can be derived from the corresponding dihydroxy polydiorganosiloxane (23):

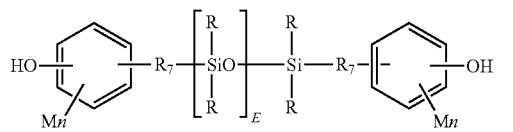

(23)

wherein each of R, E, M, $R_7$, and n are as described above. Such dihydroxy polysiloxanes can be made by effecting a platinum-catalyzed addition between a siloxane hydride of formula (24):

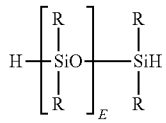

(24)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-all yl-4,6-di methylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

(4) Method of Making Polycarbonate

Polycarbonates may be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors may include, for example, a carbonyl halide such as carbonyl dibromide or carbonyl dichloride (also known as phosgene), or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. For example, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

The polycarbonate may be prepared by a melt polymerization process. Generally, in the melt polymerization process, polycarbonates are prepared by co-reacting, in a molten state, the dihydroxy reactant(s) (i.e. aliphatic diol and/or aliphatic diacid, and any additional dihydroxy compound) and a diaryl carbonate ester, such as diphenyl carbonate, or more specifically in an embodiment, an activated carbonate such as bis (methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY* mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

(5) End Capping Agent

All types of polycarbonate end groups are contemplated as being useful in the high and low Tg polycarbonates, provided that such end groups do not significantly adversely affect desired properties of the compositions. An end-capping agent (also referred to as a chain-stopper) can be used to limit molecular weight growth rate, and so control molecular weight of the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be used.

Endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC, and is an ester endgroup derived from a salicylic acid ester, having the structure of formula (25):

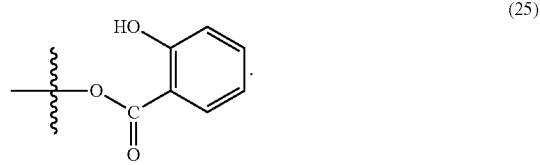 [SMILES: *OC(=O)c1ccccc1O]

(25)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any method known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028. In another specific embodiment, the activated aromatic carbonate is BMSC.

(6) Branching Groups

Polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

b. Epoxy Resin

The blend polymer composition comprises an epoxy resin. The epoxy resin may be polymeric or non-polymeric. It may be used as a hydrolytic stabilizer to improve the hydrolytic stability of the overall composition. The epoxy resin may be multifunctional meaning the epoxy has at least one or at least two epoxy groups present in each molecule of the epoxy compound. Other functional groups may also be present, provided that such groups do not substantially adversely affect the desired properties of the composition.

The epoxy compound may contain aromatic and/or aliphatic residues, as well as non-epoxy functional groups. The epoxy compound may be a polymeric compound comprising at least two epoxy groups, wherein the polymeric compound has an Mw of 1,000 to 18,000. Exemplary polymers (which as used herein includes oligomers) having multiple epoxy groups include the reaction products of an epoxy-containing ethylenically unsaturated monomer (e.g., a glycidyl($C_{1-4}$ alkyl)(meth)acrylate, allyl glycidyl ethacrylate, and glycidyl itoconate) with one or more non-epoxy functional ethylenically unsaturated compounds (e.g., styrene, ethylene, methyl (meth)acrylate, n-butyl acrylate, and the like). Specifically, the epoxy polymer may be the reaction product of an epoxy-functional (meth)acrylate monomer with a non-epoxy functional styrenic and/or ($C_{1-8}$ hydrocarbyl)(meth)acrylate and/or olefin monomer.

The epoxy resin may have the structure of formula (26):

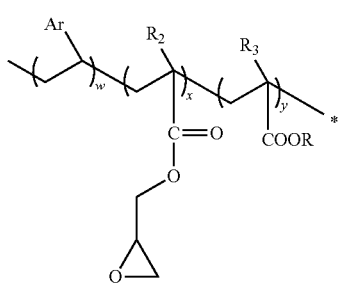

(26)

wherein Ar is $C_6$ to $C_{24}$ aryl, specifically phenyl or tolyl, R is $C_1$ to $C_{12}$ alkyl, specifically methyl, ethyl or butyl, $R_2$ and $R_3$ are each independently H or $C_1$ to $C_{12}$ alkyl, specifically methyl, ethyl or butyl, and w and y are each 0 to 98 and x is 2 to 100, and the sum of x, y and z is 100.

The epoxy polymer may be a copolymeric reaction product of a glycidyl(meth)acrylate monomer, ethylene, and optionally a $C_{1-4}$(alkyl)(meth)acrylate monomer. Useful commercially available terpolymers of this type include the ethylene-methyl acrylate-glycidyl methacrylate terpolymers sold under the trade name LOTADER by Atofina.

The epoxy polymer may be the reaction product of an epoxy-functional (meth)acrylate monomer, a non-epoxy functional styrenic monomer, and optionally a non-epoxy functional $C_{1-8}$(hydrocarbyl)(meth)acrylate monomer.

Examples of specific epoxy-functional (meth)acrylate monomers may include those containing 1,2-epoxy groups such as glycidyl acrylate and glycidyl methacrylate. Exemplary styrenic monomers may include styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene. Exemplary $C_{1-8}$(hydrocarbyl)(meth)acrylate monomers include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Specific optional comonomers are $C_{1-4}$(alkyl)(meth)acrylate monomers. Combinations comprising at least one of the foregoing comonomers may be used.

Several useful examples of styrene-(meth)acrylate copolymers containing glycidyl groups incorporated as side chains are described in International Patent Application WO 03/066704 A1, assigned to Johnson Polymer, LLC (now BASF), which is incorporated herein by reference in its entirety. A high number of epoxy groups per mole is useful, for example, 10 to 500, more specifically 100 to 400, or even more specifically 250 to 350. These polymeric materials have a weight average molecular weight of 1500 to 18,000, specifically 3,000 to 13,000, or even more specifically 4,000 to 8,500 Daltons. Epoxy-functional styrene-(meth)acrylate copolymers with glycidyl groups are commercially available from Johnson Polymer, LLC (now BASF) under the Joncryl* trade name, for example the Joncryl ADR-4368CS material.

The epoxy resin may be Joncryl ADR-4368CS.

The epoxy resin may be a monomeric or polymeric compound having two terminal epoxy functionalities, and optionally or other functionalities. The epoxy can further contain only carbon, hydrogen, and oxygen. Difunctional epoxy compounds, in particular those containing only carbon, hydrogen, and oxygen can have a molecular weight of below 1,000 g/mol. Difunctional epoxy compounds may have at least one of the epoxide groups on a cyclohexane ring. Exemplary difunctional epoxy compounds may be 3,4-epoxycyclohexyl-3,4-epoxycyclohexyl carboxylate, bis(3,4-epoxycyclohexylmethyl)adipate, and vinylcyclohexene di-epoxide, bisphenol diglycidyl ethers such as bisphenol A diglycidyl ether (available from Dow Chemical Company under the trade names DER 332, DER 661, and DER 667, or from Hexion under the trade names EPON 826, EPON 828, EPON 1001F, EPON 1004F, EPON 1005F, EPON 1007F, and EPON 1009F), tetrabromobisphenol A diglycidyl ether, glycidol, diglycidyl adducts of amines and amides, diglycidyl adducts of carboxylic acids such as the diglycidyl ester of phthalic acid and the diglycidyl ester of hexahydrophthalic acid (available from Ciba Products under the trade name Araldite CY 182), bis(3,4-epoxy-6-methylcyclohexylmethyl)adipate, butadiene diepoxide, vinylcyclohexene diepoxide, dicyclopentadiene diepoxide, cycloaliphatic epoxy resins commercially available from Dow under the trade names, ERL-4221 and ERL-4299, and the like. 3,4-epoxycyclohexyl-3,4epoxycyclohexylcarboxylate is commercially available from Union Carbide Corporation.

The epoxy resin may be added to the composition in an amount effective to aid in the retention of transparency, dimensional integrity, and/or impact strength of the composition after hydrothermal aging. The epoxy resin may be added to the blend polymer composition in an amount effective to retain the transparency of the composition after hydrothermal treatment. The epoxy resin may be added to the blend polymer composition in an amount effective to improve the retention of impact strength of the composition after hydrothermal aging. The epoxy resin may be added to the blend polymer composition in an amount effective to improve the retention of dimensional integrity of the composition after hydrothermal aging.

The epoxy resin may be added in an amount effective to maintain or improve the gloss of the overall blend polymer composition. The amount of the epoxy resin may be 0.01 to 10 wt. %, 0.01 to 5 wt. %, or 0.1 to 3 wt. %, based on the total weight of the polymer component of the composition.

c. Glass

The blend polymer composition also comprises glass. Glass is a type of filler or reinforcing agent in polycarbonates to improve stiffness (modulus) and dimensional stability (coefficient of thermal expansion). The remaining components of the blend polymer composition counteract a decrease in melt flow and an increase in melt viscosity as the percent of glass increases. Furthermore, the blend polymer composition may not include fillers and impact modifiers that will interfere with the gloss of the composition.

The glass may be glass fibers, such as E, A, C, ECR, R, S, D, or NE glasses. The glass may be manufactured by Owen-Corning. The glass may be colorless or any color in the spectrum (i.e, blue, red, green, brown, green, yellow, etc). The glass may be in the form of glass flakes, fiber glass, and chopped glass. A glass fiber strand may be flat, having an oblong, elliptical, cylinder or rectangular cross-sectional shape with the ratio between its maximum and its minimum dimensions being in the range of 1.2:1 to 10:1. The glass may be coated with one or more organic coatings, or may not be coated with one or more organic coatings.

The glass fiber may be a cylinder. The dimension of the cylinder may be 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, or 100 micrometers (μm) in diameter. The cylinder may be 2-29 μm, 3-25 μm, 4-23 μm, 5-21 μm, 6-20-16 μm, 9-19 μm, 10-17 μm, 11-16 μm, 12-15.5 μm, or 13-15 μm in diameter. The cylinder may be 12-15.5 μm in diameter. The cylinder may be 1 to 10 millimeters (mm), 1 to 9 mm, 1 to 8 mm, 1 to 7 mm, 1 to 6 mm, 1 to 5 mm, 1 to 4 mm, 1 to 3 mm, or 1 to 2 mm in length. The cylinder may be 2 to 12 mm, 2 to 11 mm, 2 to 10 mm, 2 to 9 mm, 2 to 8 mm, 2 to 7 mm, 2 to 6 mm, 2 to 5 mm, 2 to 4 mm or 2 to 3 mm in length. The cylinder may be 2 to 5 mm in length.

The glass may be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% by weight of the total composition. The glass may have a diameter of 2, 3, 4, 5, 6, 7, 8, 9, 10, 11, 12, 13, 14, 15, 16, 17, 18, 19, 20, 21, 22, 23, 24, or 25 microns. The glass may have a diameter of 2-25 micrometers, specifically, 6 to 17 micrometers. The glass may have a varying diameter over the length on one piece of glass. The glass may be dispersed in an aqueous solution having a pH of 5.0 to 9.0. The glass may be dispersed in an aqueous solution having a pH of 6.0 to 7.5. The glass preferably contains less than 100 parts per million (ppm) of boron.

The fiber glass may have a diameter of 2, 3, 4, 5, 6, 7, 8, 9, 10, 11, 12, 13, 14, 15, 16, 17, 18, 19, 20, 21, 22, 23, 24, or 25 micrometers. The glass may have a diameter of 2 to 25 micrometers, specifically, 6 to 17 micrometers. The fiber glass may have a varying diameter over the length on one piece of glass. The fiber glass contains less than 100 parts per million of boron. The fiber glass may be coated with one or more organic coatings, or may not be coated with one or more organic coatings.

The filler may be 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, 24 weight %, 25 weight %, 26 weight %, 27 weight %, 28 weight %, 29 weight %, 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based upon a total weight of the composition. The filler may be 10 to 50 weight %, 10 to 40 weight %, 20 to 40 weight %, 25 to 35 weight %, or 29 to 31 weight % based upon a total weight of the composition.

The glass may be 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, 24 weight %, 25 weight %, 26 weight %, 27 weight %, 28 weight %, 29 weight %, 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based upon a total weight of the composition. The glass may be 10 to 50 weight %, 10 to 40 weight %, 20 to 40 weight %, 25 to 35 weight %, or 29 to 31 weight % based upon a total weight of the composition.

The chopped or fiber glass may be 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, 24 weight %, 25 weight %, 26 weight %, 27 weight %, 28 weight %, 29 weight %, 30 weight %, 31 weight %, 32 weight %, 33 weight %, 34 weight %, 35 weight %, 36 weight %, 37 weight %, 38 weight %, 39 weight %, 40 weight %, 41 weight %, 42 weight %, 43 weight %, 44 weight %, 45 weight %, 46 weight %, 47 weight %, 48 weight %, 49 weight %, or 50 weight % based upon a total weight of the composition. The chopped or fiber glass may be 10 to 50 weight %, 10 to 40 weight %, 20 to 40 weight %, 25 to 35 weight %, or 29 to 31 weight % based upon a total weight of the composition.

d. Other Additives (1) Impact Modifiers

The blend composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polycarbonate blend composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

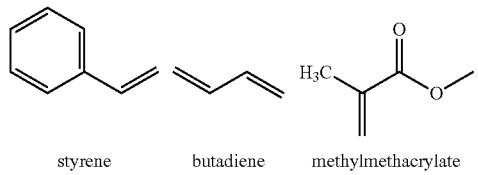

styrene      butadiene      methylmethacrylate

SEBS may be a linear triblockcopolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of the blend composition. Impact modifiers may include MBS and SBS.

(2) UV Stabilizers

The blend composition may further comprise a UV stabilizer for improved performance in UV stabilization. UV stabilizers disperse UV radiation energy.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octloxybenzophenoe (Uvinul* 3008), 6-tert-butyl-2-(5-chloro-2H-benzotriazole-2-yl)-4-methylphenyl (Uvinul* 3026), 2,4-di-tert-butyl-6-(5-chloro-2H-benzotriazole-2-yl)-phenol (Uvinul* 3027), 2-(2H-benzotriazole-2-yl)-4,6-di-tert-pentylphenol (Uvinul* 3028), 2-(2H-benzotriazole-2-yl)-4-(1,1,3,3-tetramethylbutyl)-phenol (Uvinul* 3029), 1,3-bis[(2'cyano-3',3'-diphenylacryloyl)oxy]-2,2-bis-{[(2'-cyano-3',3'-diphenylacryloyl)oxy]methyl}-propane (Uvinul* 3030), 2-(2H-benzotriazole-2-yl)-4-methylphenol (Uvinul* 3033), 2-(2H-bezhotriazole-2-yl)-4,6-bis(1-methyl-1-phenyethyl) phenol (Uvinul* 3034), ethyl-2-cyano-3,3-diphenylacrylate (Uvinul* 3035), (2-ethylhexyl)-2-cyano-3,3-diphenylacrylate (Uvinul* 3039), N,N'-bisformyl-N,N'-bis(2,2,6,6-tetramethyl-4-piperidinyl)hexamethylendiamine (Uvinul* 4050H), bis-(2,2,6,6-tetramethyl-4-pipieridyl)-sebacate (Uvinul* 4077H), bis-(1,2,2,6,6-pentamethyl-4-piperdiyl)-sebacate+methyl-(1,2,2,6,6-pentamethyl-4-piperidyl)-sebacate (Uvinul* 4092H) or a combination thereof.

The polycarbonate blend composition may comprise one or more UV stabilizers, including Cyasorb 5411, Cyasorb UV-3638, Uvinul 3030, and/or Tinuvin 234.

Certain monophenolic UV absorbers, which can also be used as capping agents, can be utilized as one or more additives; for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

(3) Colorants

The blend composition may further comprise colorants such as pigment and/or dye additives may be present in the composition. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the blend composition.

(4) Flame Retardants

The blend composition may further comprise flame retardants. Various types of flame retardants can also be utilized as additives. In one embodiment, the flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxoanion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the polycarbonate compositions disclosed herein.

In another embodiment, the flame-retardants are selected from at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

In another embodiment, the flame retardant is not a bromine or chlorine containing composition.

In another embodiment, the flame retardant additives include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis (dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis (dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas below:

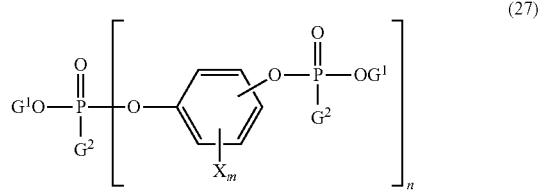
(27)

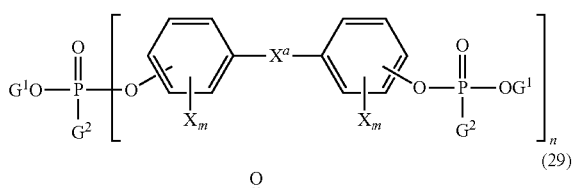
(28)

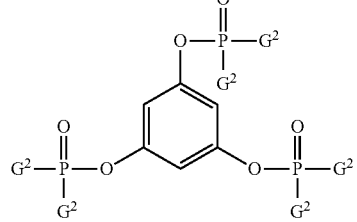
(29)

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric.counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, and tris(aziridinyl) phosphine oxide.

The flame retardant additive may have formula (30):

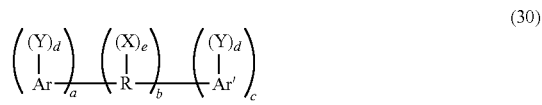
(30)

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (30) are each independently mono- or polycarbocyclic aromatic groups such as phenylene, biphenylene, terphenylene, naphthylene, or the like.

Y is an organic, inorganic, or organometallic radical, for example halogen, e.g., chlorine, bromine, iodine, fluorine; ether groups of the general formula OB, wherein B is a monovalent hydrocarbon group similar to X; monovalent hydrocarbon groups of the type represented by R; or other substituents, e.g., nitro, cyano, and the like, said substituents being essentially inert provided that there is greater than or equal to one, specifically greater than or equal to two, halogen atoms per aryl nucleus. One or both of Ar and Ar' may further have one or more hydroxyl substituents.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; an aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (30) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt %, more specifically 0.02 to 5 wt %, based on 100 parts by weight of the blend composition.

In addition to the flame retardant, for example, the herein described polycarbonates and blends can include various additives ordinarily incorporated in polycarbonate compositions, with the proviso that the additives are selected so as to not significantly adversely affect the desired properties of the polycarbonate. Combinations of additives can be used. Such additives can be mixed at a suitable time during the mixing of the components for forming the polycarbonate and/or blend.

(5) Heat Stabilizers

The blend composition may further comprise heat stabilizers. Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the blend composition.

(6) Plasticizers, Lubricants, Mold Release Agents

The blend composition may further comprise plasticizers, lubricants, mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the blend composition.

(7) Other Filler or Reinforcing Agents

The blend composition may further comprise other fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like;

flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, though, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the blend composition.

(8) Antioxidant Additives

The blend composition may further comprise an antioxidant additive. Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4: hydroxyphenyl)-propionic acid or the like, or combinations comprising at least one of the foregoing antioxidants. Antioxidants are generally used in amounts of 0.0001 to 1 part by weight, based on 100 parts by weight of the blend composition.

(9) Antistatic Agents

The blend composition may further comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT* 6321 (Sanyo) or PEBAX* MH1657 (Atofina), IRGASTAT* P18 and P22 (Ciba-Geigy). Other polymeric materials may be used as antistatic agents are inherently conducting polymers such as polyaniline (commercially available as PANIPOL*EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be used in a polymeric resin containing chemical antistatic agents to render the composition electrostatically dissipative. Antistatic agents are generally used in amounts of 0.0001 to 5 parts by weight, based on 100 parts by weight of the blend composition.

(10) Blowing Agents

The blend composition may further comprise blowing agent. Foam may be a useful blowing agent. Low boiling halohydrocarbons and those that generate carbon dioxide may be used as blowing agents. Blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4'oxybis (benzenesulfonylhydrazide), sodium bicarbonate, ammonium carbonate, or the like, or combinations comprising at least one of the foregoing blowing agents. Blowing agents may be used in amounts of 0.01 to 20 parts by weight, based on 100 parts by weight of the blend composition.

(11) Anti-Drip Agents

The blend composition may further comprise anti-drip agents. The anti-drip agent may be a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the blend composition.

(12) Radiation Stabilizers

The blend composition may further comprise radiation stabilizers. The radiation stabilizer may be a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($—CH_2OH$) or it can be a member of a more complex hydrocarbon group such as $—CR^4HOH$ or $—CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the blend composition.

2. Mixers and Extruders—Method of Making the Composition

The blend composition can be manufactured by various methods. For example, the polycarbonate, epoxy resin and glass may be first blended in a high speed HENSCHEL-Mixer*. Other low shear processes, including but not limited to hand mixing, can also accomplish this blending. The blend may then be fed into the throat of a single or twin-screw extruder via a hopper. Alternatively, at least one of the components can be incorporated into the composition by feeding directly into the extruder at the throat and/or downstream through a side-stuffer. Additives can also be compounded into a master-batch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

3. Articles

The blended polymer composition may be formed, shaped, molded or injection molded into an article. The article formed from the composition may have a gloss value of 85, 86, 87, 88, 89, 90, 91, 92, 93, 94, 95, 96 or higher at 60° according to ASTM-D523 wherein the article has at least one side with a thickness of at least 0.15, at least 0.16, at least 0.17, at least 0.18, at least 0.19, at least 0.20, at least 0.21, at least 0.22, at least 0.23, at least 0.24, at least 0.25, at least 0.26, at least 0.27, at least 0.28, at least 0.29, at least 0.30, at least 0.31, at least 0.32, at least 0.33, at least 0.34, at least 0.35, at least 0.36, at least 0.37, at least 0.38, at least 0.39, or at least 0.40 mm, a UL flame rating of at least HB at 0.8 mm, and a gloss on at least one side with a thickness of less than 0.8 mm.

The article formed from the composition may have a gloss value of 89 or higher at 60° according to ASTM-D523 wherein the article has at least one side with a thickness of at least 0.3 mm, and a UL flame rating of at least HB at 0.8 mm. The gloss value of 89 or higher at 60° may be on at least one side with a thickness of less than 0.8 mm.

The compositions can be molded into useful shaped articles by a variety of means such as injection molding, extrusion, rotational molding, blow molding and thermoforming to form articles such as, for example, various components for cell phones and cell phone covers, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like.

The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, cell phones, television bezels, desktops, and telecommunications parts such as parts for base station terminals.

The article may be formed from a polyester-polycarbonate with a gloss value of 90 or higher at 60°, according to ASTM-D523, wherein the article has at least one side with a thickness of 0.3 mm to 0.8 mm, or 0.3 mm to 0.5 mm, a UL flame rating of at least HB at 0.8 mm, and a gloss on at least one side with a thickness of less than 0.8 mm. The article may comprise the composition as described above. The article may have a biocontent of at least 5 weight % of a total weight of resin in the article (e.g., excluding fillers and additives) according to ASTM-D6866.

The article may be painted or metalized. Metallization can be accomplished by vapor deposition, or non-conducting vacuum metallization. The article may further comprise a metal frame made from aluminum, tin, cobalt, stainless steel, gold, platinum, silver or iron that is overmolded with the polyester-polycarbonate blend. The metalized article may be formed by vapor deposition. The article may be an electrical component, a medical device component or a component of a meter system. The article may be a smart meter housing, a mobile phone, a camera, a camera/lens mount including the inner parts of the camera and lens, a digital video, an electronic tablet, a hand receiver, an IC card case, a game device, a rice cooker, an electronic tablet, or a kitchen appliance.

4. Method of Making the Article from the Blended Polymer Composition

The article may be produced by a manufacturing process. The process may comprise the steps of (a) providing a blended copolymer comprising (i) one or more polyester-polycarbonates as described above wherein at least one of the polyester-polycarbonates has at least some structural units derived from sebacic acid, (ii) glass as described above and (iii) an epoxy as described above. The blended copolymer from step (a) is then (b) melted at 200 to 400° C., 225 to 350°

C., 250 to 310° C., or 270 to 290° C. in an extruder. The blended copolymer of step (b) is then (c) extruded, and (d) the blended copolymer is isolated or chopped. The article of manufacture may further be produced by the steps of (e) drying the blended copolymer of (d) wherein the shift in melt flow rate at 6 minutes and 18 minutes residence time is less than 10% at 300° C./1.2 kg, and (f) molding in an injection molder to form the article as described above.

The present invention has multiple aspects, illustrated by the following non-limiting examples.

Example 1

Synthesis of Sebacic Acid Copolyestercarbonate Resin

Bisphenol-A and sebacic acid were weighed and then transferred to a formulation tank, which contains methylene chloride, water, triethylamine (catalyst) and a small amount of aqueous sodium hydroxide. The mixture was agitated for 5 minutes then transferred to the polymerization reactor. Phosgene was added to the reaction mixture over the course of 25 minutes. P-cumylphenol was added to the reactor over the course of five minutes during the phosgenation. Aqueous sodium hydroxide was co-added in order to control reaction pH.

An alternative reaction process may be used and was undertaken as follows: sebacic acid was dissolved in a mixture of water and aqueous sodium hydroxide. Bisphenol-A was weighed then transferred to a formulation tank which contains methylene chloride, water and triethylamine (catalyst). The formulation mixture was then transferred to the polymerization reactor. Sebacic acid solution was transferred to the polymerization reactor. Phosgene was added to the reaction mixture over the course of 25 minutes. P-cumylphenol was added to the reactor over the course of five minutes during the phosgenation. Aqueous sodium hydroxide was co-added in order to control reaction pH.

After completion of the polymerization, the reaction mixture was discharged to the centrifuge feed tank. The polymer solution was purified by feeding the reaction product to a train of liquid/liquid centrifuges. The first centrifuge stage separates the reaction by-product brine from the resin solution. The second centrifuge stage removes catalyst from the resin solution by washing with dilute aqueous hydrochloric acid. The third centrifuge stage removes residual ionic species by washing the resin solution with water.

The purified resin solution was then concentrated by evaporation of methylene chloride. The resin is precipitated by co-feeding the resin solution to a jet with steam to flash off the methylene chloride. Residual methylene chloride was removed from the resin by counter current contact with steam. Excess water was removed from the resin using heated air in a fluidizing dryer.

Example 2

Specific Sebacic Acid Copolyestercarbonate Resin Synthesis Process

In a Nalgene plastic container was placed sebacic acid (325 g, 1.6 moles), 50% NaOH (280 g, 3.5 moles) and water (2500 ml). The mixture was placed on a platform shaker and mixed until dissolved. To the formulation tank was added dichloromethane (10 L), deionized water (10 L), bisphenol-A (4175 g, 18.3 moles), the sebacic acid solution from above, para-cumyl phenol (135 g, 0.64 moles), triethylamine (50 g, 0.49 moles, 2.5 mol %), and sodium gluconate (10 g). The mixture was stirred and transferred to the batch reactor. The reactor agitator was started and the circulation flow was set at 80 L/min. Phosgene vapor flow to the reactor was initiated by the DCS in three continuous segments separated by different pH targets. Reaction pH was controlled by DCS addition of 50% aqueous NaOH. During segment 1 (50% of total phosgene charge, 1295 g, 13.1 moles) the reaction pH target was 7.25. During segment 2 (phosgene charge 320 g, 3.2 moles) the reaction pH target was ramped from 7.25 to 10.2. Segment 3 (phosgene 965 g, 9.7 moles) maintained a pH target of 10.2 until the total phosgene set-point was reached (2580 g, 26.0 moles). A sample of the reactor was obtained and verified to be free of un-reacted BPA and free of chloroformate. Mw of the reaction sample was determined by GPC (Mw 27188, PDI=2.7). The reactor was purged with nitrogen and the batch was transferred to centrifuges for HCl/water wash and isolation via steam precipitation.

Charges for the C914089 (21,500 Mw, 6.0 mol %) were as follows: sebacic acid (242 g, 1.19 moles), BPA (4268 g, 18.71 moles), and PCP (163 g, 0.77 moles). A list of example additional monomers and process chemicals for C914089 is shown in FIG. 1.

Charges for the C914090 (36,500 Mw, 8.25 mol %) were as follows: sebacic acid (333 g, 1.64 moles), BPA (4165 g, 18.26 moles), and PCP (88 g, 0.42 moles). A list of example additional monomers and process chemicals for C914090 is shown in FIG. 2.

As shown, the resins C914089 and C914090 contain less than 100 ppm sebacic acid monomer impurity, less than 4 ppm triethylamine impurity, less than 10 ppm methylene chloride impurity, and less than 100 ppb carbon tetrachloride impurity.

Example 3

Compounding Process

All formulations were thoroughly compounded in a 30 mm co-rotating twin screw (Werner & Pfleiderer; ZSK-30) extruder using a melt temperature of 300° C. with a rate of 20 kgs/hr, 20 inches of mercury vacuum and a screw speed of 400 RPM. Chopped fiber glass was added during the compounding step via a downstream feeder. The extrudate was cooled under water, pelletized and dried at 120° C. for 4 hours with a desiccant bed dryer. To make test specimens, the dried pellets were injection molded using a Van Dorn 80T molding machine at 300° C. melt temperature to form test parts for impact and mechanical testing. Physical and mechanical properties of the test materials in this study were measured using ASTM and ISO test standards. 60-degree gloss measurements were recorded using a BYK Microgloss gloss meter.

Resin descriptions, molecular weight values, and resin bio-contents are shown in Table 1.

TABLE 1

| Resin | Description | ASTM D6866 Bio-Content | Mw (GPC) | PDI (GPC) |
|---|---|---|---|---|
| C914089 | 6 mol % sebacic acid polycarbonate copolymer | 5.0% | 21500 | 2.6 |
| C914090 | 8.25 mol % sebacic acid polycarbonate copolymer | 6.0% | 36500 | 2.7 |

TABLE 1-continued

| Resin | Description | ASTM D6866 Bio-Content | Mw (GPC) | PDI (GPC) |
|---|---|---|---|---|
| C017 | Bisphenol-A polycarbonate | 0.0% | 21900 | 2.5 |
| CPCFOQ | Bisphenol-A polycarbonate | 0.0% | 17900 | 2.4 |

Each of C914090 and C914089 have the following general structure (formula 14):

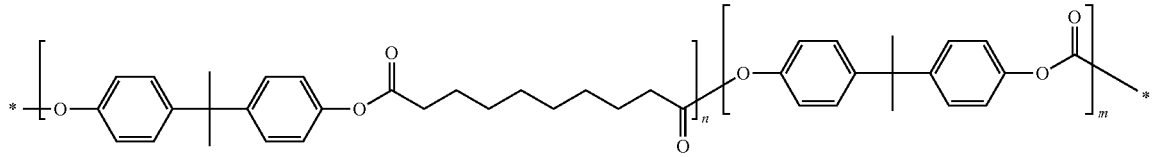

For C914090 (8.25 mol % sebacic acid, Mw=36500), n is 4.6 and m is 51.2. For C914089 (6.0 mol % sebacic acid, Mw=21500), n is 2.2 and m is 35.

Both copolymer resins have a Tg of ~135° C. Of particular interest for this disclosure are 30 wt % glass-filled formulations of copolyestercarbonate and BPA polycarbonate formulations (labeled GFHFD-30 and GFPC-30) which were formulated to identical MVR values of 14 cm$^3$/10 min measured according to ASTM D1238 at 300° C. and 1.2 kg, 6 minute dwell. The formulations for these materials are listed below in Table 2:

TABLE 2

| Material | Description | Manufacturer | GFHFD-30 Wt % | GFPC-30 Wt % |
|---|---|---|---|---|
| C914089 | Lo Mw (sebacic acid copolymer) | SABIC-IP | 61.85 | 0.00 |
| C914090 | Hi Mw (sebacic acid copolymer) | SABIC-IP | 6.872 | 0.000 |
| C017 | Hi Flow PC (BPA-Polycarbonate) | SABIC-IP | 0.000 | 51.538 |
| CPCFOQ | OQ PC (BPA-Polycarbonate) | SABIC-IP | 0.000 | 17.179 |
| F542 | Irgaphos | Ciba Specialty Chemicals | 0.059 | 0.059 |
| F538 | Pentaerythritol tetrastearate (PETS) | Lonza, Inc. | 0.265 | 0.265 |
| F722236 | Joncryl epoxy | BASF | 0.098 | 0.098 |
| G912 | bonding glass fiber | Owens Corning | 30.000 | 30.000 |
| R206GF | carbon black FG | SABIC-IP | 0.8600 | 0.8600 |

A comparison in physical properties between these materials is shown below in Table 3. All formulations were thoroughly compounded in a 30 mm co-rotating twin screw (Werner & Pfleiderer; ZSK-30) extruder using a melt temperature of 300° C. with a rate of 20 kgs/hr, 20 inches of mercury vacuum and a screw speed of 400 RPM. Chopped fiber glass was added during the compounding step via a downstream feeder. The extrudate was cooled under water, pelletized and dried at 120° C. for 4 hours with a desiccant bed dryer. To make test specimens, the dried pellets were injection molded using a Van Dorn 80T molding machine at 300° C. melt temperature to form test parts for impact and mechanical testing. Physical and mechanical properties of the test materials in this study were measured using ASTM and ISO test standards. 60-degree gloss measurements were recorded using a BYK Microgloss gloss meter.

The results from Table 3 show that GFPC-30 derived from 30 wt % glass blends of BPA polycarbonate and GFHFD-30 derived from 30 wt polyestercarbonates blends have identical melt flows and very similar glass dominated properties (i.e., Flexural Modulus and Tensile Modulus performance and density) that are essential to maintain for the targeted product applications.

TABLE 3

| Test | Test Method | GFPC-30 | GFHFD-30 |
|---|---|---|---|
| Melt Volume Rate, 300° C., 1.2 kgf (cm$^3$/10 min) | ASTM D1238 | 14 | 14 |
| HDT, 0.45 MPa, 3.2 mm, unannealed (° C.) | ASTM D648 | 129 | 145 |
| HDT, 1.82 MPa, 3.2 mm, unannealed (° C.) | ASTM D648 | 125 | 142 |
| Flexural Modulus, 1.3 mm/min (MPa) | ASTM D790 | 7500 | 7840 |
| Tensile Modulus, 5 mm/min (MPa) | ASTM D638 | 8800 | 9100 |
| Density (g/cm$^3$) | ASTM D792 | 1.44 | 1.44 |

Example 4

Disc Molding and Plaque Molding Studies

The gloss results of disc molding and plaque injection molding studies are presented below for GFPC-30 and GFHFD-30 in Tables 4 and 5, respectively. In Table 4, the discs measured 100 mm in diameter and 0.8 mm in thickness and were molded using various melt and mold temperatures with a constant injection speed and pressure. In Table 5, the plaques were 100 mm×100 mm square, 2.5 mm in thickness, and were subjected to varying injection speed and injection pressure but with a constant melt temperature of 325° C. and a mold temperature of 95° C.

Figure 4:
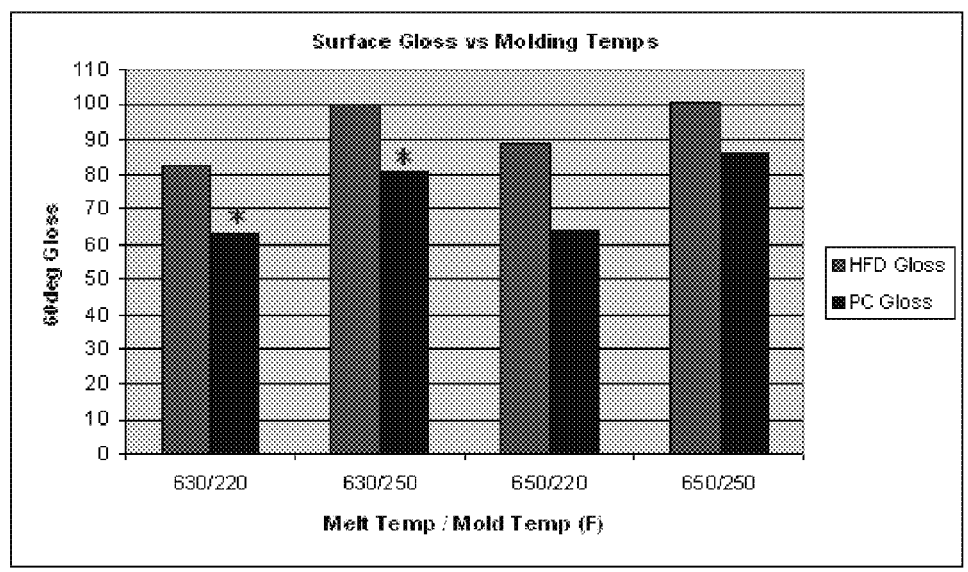
FIG. 4 shows results of surface gloss measurements at the centers of 0.8 mm thickness discs plotted against mold and melt temperatures.

The results of an injection molding study using a 0.8 mm thickness×100 mm diameter circular disc tool are shown in FIG. 3. From the results of the disc molding study the GFHFD-30 glass-filled material shows lower injection pressures compared to the GFPC-30. In addition, at lower melt temperature the GFPC-30 material was unable to completely fill the 0.8 mm disc part. The surface gloss at the center of each 0.8 mm thickness disc was recorded for the GFHFD-30 and GFPC-30 molding study. The results are shown in FIG. 4.

TABLE 4

| Example | Melt Temp (° C.) | Mold Temp (° C.) | 60° Gloss |
|---|---|---|---|
| GFHFD-30 | 330 | 120 | 100 |
| GFPC-30 | 330 | 120 | 80 |

TABLE 4-continued

| Example | Melt Temp (° C.) | Mold Temp (° C.) | 60° Gloss |
|---|---|---|---|
| GFHFD-30 | 345 | 105 | 89 |
| GFPC-30 | 345 | 105 | 65 |
| GFHFD-30 | 345 | 120 | 100 |
| GFPC-30 | 345 | 120 | 86 |

TABLE 5

| Example | Inject Speed (mm/min) | Inject Pressure (psi) | 60° Gloss |
|---|---|---|---|
| GFHFD-30 | 25 | 450 | 52 |
| GFPC-30 | 25 | 450 | 21 |
| GFHFD-30 | 100 | 725 | 79 |
| GFPC-30 | 100 | 725 | 55 |
| GFHFD-30 | 150 | 900 | 86 |
| GFPC-30 | 150 | 900 | 62 |

In every example from Tables 4 and 5, the glass filled polyestercarbonate showed improved gloss values compared with the glass filled BPA polycarbonate. For the 0.8 mm discs, the improvement ranged from 16% to 36% versus the BPA polycarbonate Example 5

Spiral Flow and Injection Molding Study

The results of spiral flow molding at 0.8 mm thickness (melt temperature 330° C., mold temperature 110° C.) are shown below in Table 6. Despite having the same MVR, the GFHFD-30 sample shows 12% longer spiral flow compared to the GFPC-30 sample.

TABLE 6

| Sample | Spiral Flow (mm) |
|---|---|
| GFHFD-30 | 85 |
| GFPC-30 | 76 |

Based on the results of spiral flow and circular disc molding studies at 0.8 mm thickness, the 30% glass-filled HFD material is particularly suited for thin-wall molding compared to a comparable 30% glass-filled PC.

Figure 5:
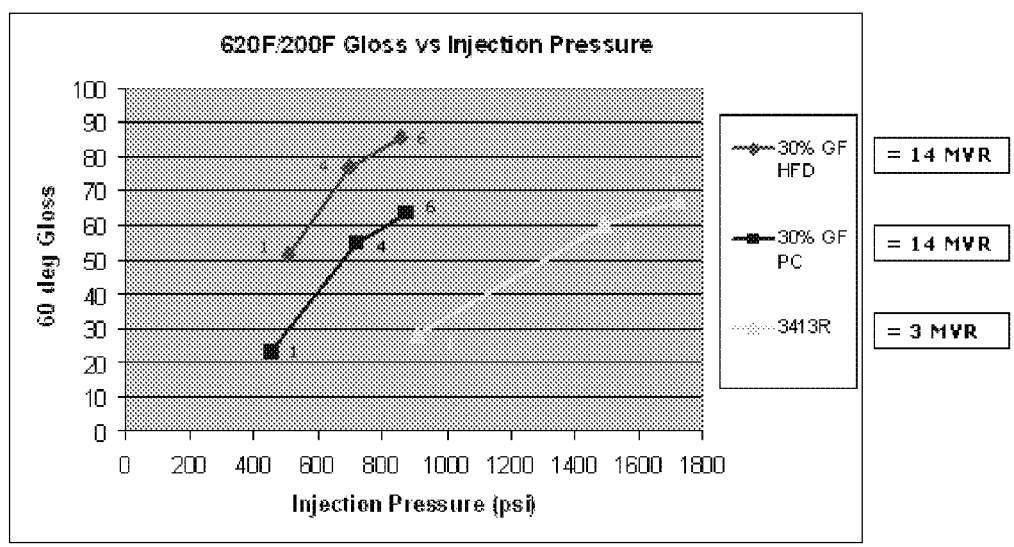
FIG. 5 shows results relating to the impact of injection speed and injection pressure and surface gloss.

Under all molding conditions, the GFHFD-30 samples showed higher surface gloss compared to the GFPC-30 reference material. It is known that injection speed (and resulting injection pressure) can play a critical role in determining the surface gloss in glass-filled polycarbonate materials. To examine this relationship, a molding study was performed using a 2.5 mm thickness×100 mm square plaque tool at melt temperature 620° F. and mold temperature of 200° F. Three different injection speeds were used for the study: 25 mm/min. 100 mm/min, and 150 mm/min. The results of this study are shown in FIG. 5.

For both glass-filled HFD and glass-filled PC materials, increasing injection speed results in an increase in injection pressure and increase in surface gloss. However, the GFHFD-30 sample shows consistently higher surface gloss at a given injection molding condition compared to the GFPC-30 material. These results, coupled with the 0.8 mm thickness spiral flow and disc molding study, demonstrate why the glass-filled HFD copolymer materials are particularly suited for applications such as mobile phone and portable electronic housings which require high flow, thin-wall molding capability, and high gloss or low roughness surface finish.

Example 6

Double-Gated Tensile Bar Mechanical Property Study

Standard ASTM tensile bars (3.2 mm thickness) were molded from GFPC-30 and GFHFD-30 materials under identical conditions and 300° C. melt temperature. Injection speeds of 1 in/sec and 5 in/sec were used for each material. The double-gated tensile bar tool was designed to have a gate at each end, which creates a knit line in the center of the molded tensile bar part. The tensile properties for each material were measured according to ASTM D638. The results shown are an average of 10 test bars per sample. See Table 7.

TABLE 7

| Sample | Inject Speed (in/sec) | Tensile Elongation at Break (%) | Tensile Strength (MPa) |
|---|---|---|---|
| GFPC-30 | 1 | 1.1 | 52.4 |
| GFPC-30 | 5 | 1.1 | 52.7 |
| GFHFD-30 | 1 | 1.5 | 59.8 |
| GFHFD-30 | 5 | 1.3 | 57.6 |

The results from Table 7 illustrate a surprising improvement in Tensile Strength at Break and Tensile Elongation at Break at part knitlines for glass filled polyestercarbonte compared with BPA polycarbonate. Tensile Elongation at Break improved 18% to 36% depending on injection speed and Tensile Strength at Break improved from 9% to 14% depending on injection speed. Knit lines result when molten resin streams meet in a mold that has multiple filling positions or gates. The use of multiple gates in part design is a common industry practice to reduce part filling time and to ensure complete part filling when complex mold designs are needed to create parts with intricate molded-in features. Knit lines are often the weak point in a molded part and sites of part cracking or breaking. Therefore it would be highly desirable to use expected glass filled polyestercarbonate formulations in molding processes involving molds employing multiple gates and having multiple knit lines.

Example 7

115° C. Autoclave Hydrostability Results

Table 8 shows results of hydrostability testing for both GFHFD-30 (30 weight % glass-filled polyestercarbonate formulation) and GFHFD-10 (10 weight % glass filled polyestercarbonate formulation) materials without and with Joncryl ADR4368CS Epoxy added to the formulations. The testing was conducted on 2.5 mm thick 100 mm×100 mm square molded plaques heated in a 115° C. autoclave for 150 h. The Mw values were determined by measuring the Mw using a GPC method and employing polycarbonate standards on samples removed from the polyestercarbonate molded plaques before and after hydrostability testing. % Mw retention was calculated by dividing the Mw of the polyestercarbonate sample after the autoclave testing by the Mw of the polyestercarbonate sample before the autoclave testing. The results in Table 8 show that GFHFD-10 without Joncryl ADR4368CS Epoxy added to the formulation exhibits 58% MW retention after autoclave testing but with the addition of only 0.1 wt % Joncryl ADR4368CS Epoxy to the formulation 80% Mw retention after autoclave testing is achieved. A similar trend although a smaller change is observed with GFHFD-30 after autoclave testing. These results show the benefits of adding an epoxy additive into glass filled copolyestercarbonate formulations to improve the hydrostability of glass filled polyestercarbonate formulations.

TABLE 8

| Sample | % Mw Retention 150 hrs 115° C. Autoclave |
|---|---|
| GFHFD-30 | 84% |
| GFHFD-30 + 0.1 wt % Joncryl ADR4368CS Epoxy | 88% |
| GFHFD-10 | 58% |
| GFHFD-10 + 0.1 wt % Joncryl ADR4368CS Epoxy | 80% |

In an embodiment, a blend composition can comprise: one or more polycarbonates wherein at least one of the polycarbonates is a polyester-polycarbonate having at least one unit derived from sebacic acid and has a biocontent of at least 5 weight % based upon a total weight of the polyester-polycarbonate, determined according ASTM-D6866; a glass content of 10 weight % or greater based upon a total weight of the composition; and an epoxy resin. The composition has a melt volume rate of greater than 10.5 cm³/10 minutes at 300° C./1.2 kg according to ASTM-D1238-10. A part molded having a 0.8 mm thickness molded from the composition has a gloss value of 89 or higher at 60°, according to ASTM-D523.

In another embodiment, a composition can comprise: two or more polyester-polycarbonates wherein the polyester-polycarbonates are derived from bis-phenol A and sebacic acid, and have a biocontent of at least 5 weight % based upon a total weight of the polyester-polycarbonate, determined according ASTM-D6866; a glass content of 10 weight % or greater based upon a total weight of the composition; and an epoxy resin. The composition has a melt volume rate of greater than 10.5 cm³/10 minutes at 300° C./1.2 kg according to ASTM-D1238-10. A part molded having a 0.8 mm thickness molded from the composition has a gloss value of 89 or higher at 60°, according to ASTM-D523.

In yet another embodiment, a composition can comprise: one or more polyester-polycarbonates wherein at least one of the polyester-polycarbonates derived from sebacic acid and bisphenol A, and has a biocontent of at least 5 weight % based upon a total weight of the polyester-polycarbonate, determined according ASTM-D6866; glass; and an epoxy resin wherein the epoxy resin is an epoxy-functional styrene-(meth)acrylate copolymer with glycidyl groups. At least one polyester-polycarbonate has (a) a weight average molecular weight of 34,000 to 39,000 Daltons as measured by gel permeation chromatography using BPA polycarbonate standards and a sebacic acid content of 7.0 mole % to 9.0 mole %; or (b) a weight average molecular weight of 19,000 to 23,000 Daltons as measured by gel permeation chromatography using BPA polycarbonate standards, and a sebacic acid content of 5.0 mole % to 7.0 mole %. The glass content is 10 to 40 weight % of the total composition. The glass transition temperature of the composition is 130° C. to 147° C. The composition has a melt volume rate of greater than 10.5 cm³/10 minutes at 300° C./1.2 kg according to ASTM-D1238-10, and a part molded having a 0.8 mm thickness molded from the composition has a gloss value of 89 or higher at 60°, according to ASTM-D523.

In still another embodiment, a composition can comprise: one or more polycarbonates wherein at least one of the polycarbonates is a polyester-polycarbonate having at least one unit derived from sebacic acid and has a biocontent of at least 5 weight % based upon a total weight of the polyester-polycarbonate, determined according ASTM-D6866; a filler content of 10 weight % or greater based upon a total weight of the composition; and an epoxy resin. The composition has a melt volume rate of greater than 10.5 cm³/10 minutes at 300° C./1.2 kg according to ASTM-D1238-10, and a part molded having a 0.8 mm thickness molded from the composition has a gloss value of 89 or higher at 60°, according to ASTM-D523.

In the various embodiments of the composition: (i) the composition can be a blended composition; and/or (ii) at least one polyester-polycarbonate has (a) a weight average molecular weight of 34,000 to 39,000 Daltons as measured by gel permeation chromatography using BPA polycarbonate standards, and a sebacic acid content of 7.0 mole % to 9.0 mole %; or (b) a weight average molecular weight of 19,000 to 23,000 Daltons as measured by gel permeation chromatography using BPA polycarbonate standards, and a sebacic acid content of 5.0 mole % to 7.0 mole %; and/or (iii) the polyester-polycarbonate has a weight average molecular weight of 35,000 to 38,000 Daltons as measured by gel permeation chromatography using BPA polycarbonate standards, and a sebacic acid content of 7.75 mole % to 8.75 mole %; (iv) the polyester-polycarbonate has a weight average molecular weight of 20,000 to 22,000 Daltons as measured by gel permeation chromatography using BPA polycarbonate standards, and a sebacic acid content of 5.5 mole % to 6.5 mole %; and/or (v) at least one of the two or more polyester-polycarbonate has (a) a weight average molecular weight of 34,000 to 39,000 Daltons as measured by gel permeation chromatography using BPA polycarbonate standards, and a sebacic acid content of 7.0 mole % to 9.0 mole %; or (b) a weight average molecular weight of 19,000 to 23,00 Daltons as measured by gel permeation chromatography using BPA polycarbonate standards, and a sebacic acid content of 5.0 mole % to 7.0 mole %; and/or (vi) the polyester-polycarbonate of (a) is at a weight average molecular weight of 36,500 Daltons as measured by gel permeation chromatography using BPA polycarbonate standards and has a sebacic acid content of 8.25 mole %; and/or (vi) the polyester-polycarbonate of (b) is at a weight average molecular weight of 21,500 Daltons as measured by gel permeation chromatography using BPA polycarbonate standards and has a sebacic acid content of 6.0 mole %; and/or (vii) the glass content is 10 to 40 weight % of a total weight of the composition; and/or (viii) the glass content is 25 to 35 weight % of a total weight of the composition; and/or (ix) the glass content is 29 to 31 weight % of a total weight of the composition; and/or (x) the glass is chopped glass or fiber glass; and/or (xi) the fiber glass diameter is 6 to 17 micrometers; and/or (xii) the glass contains less than 100 parts per million boron; and/or (xiii) the filler is a glass fiber; and (xiv) the fiber is a flat glass fiber; and/or (xv) the filler is a fiber in amount of 20 to 50 weight % based upon a total weight of the composition; and/or (xvi) the polyester-polycarbonate comprises one or more of: less than 100 ppm sebacic acid monomer impurity, less than 4 ppm triethylamine impurity, less than 10 ppm methylene chloride impurity, and less than 100 ppb carbon tetrachloride impurity; and/or (xvii) the polyester-polycarbonate comprises less than 1 mole % anhydride linkages; and/or (xviii) an article molded from the composition having a 0.8 mm thickness exhibits a 15% or greater improvement in gloss at 60° according to ASTM-D523 compared with an article molded from BPA polycarbonate having the same glass loading and thickness, and molded using the same molding conditions; and/or (xix) a 0.8 mm thickness article molded from the composition using a double gated tensile bar mold exhibits a 15% or greater improvement in Tensile Elongation at Break at the knit line of the molded article compared with an article molded from BPA polycarbonate having the same glass loading and thickness, and molded using the same molding conditions; and/or (xx) a 0.8 mm thickness article molded from the composition using a double gated tensile bar mold exhibits a 10% or greater improvement in Tensile Strength at the knit line of the molded article compared with an article molded from BPA polycarbonate having the same glass loading and thickness, and molded using the same molding conditions; and/or (xxi) the glass transition temperature of the polyester polycarbonate is 130° C. to 147° C.; and/or (xxii) the glass transition temperature of the polyester polycarbonate is 133° C. to 137° C.; and/or (xxiii) the epoxy resin is a hydrolytic stabilizer; and/or (xxiv) the epoxy resin has multiple epoxy groups; and/or (xxv) the epoxy resin is an epoxy-functional styrene-(meth)acrylate copolymer with glycidyl groups; and/or (xxvi) the composition further comprises other additives such as heat stabilizers, mold release agents, impact modifiers, UV stabilizers, flame retardants, antistatic agents, anti-drip agents, blowing agents, radiation stabilizers and/or colorants.

In an embodiment, an article can be formed from any of the above identified compositions. The article can have the following characteristics: at least one side with a thickness of 0.8 mm or less; a UL flame rating of at least HB at 0.8 mm; and a gloss value 89 or higher on at least one side of the article with a thickness of less than 0.8 mm. The article can be formed by injection molding.

In an embodiment, an injection molded article comprises: one or more polyester-polycarbonates wherein at least one of the polyester-polycarbonates has at least one unit derived from sebacic acid and has a biocontent of at least 5 weight % based upon a total weight of the polyester-polycarbonate, determined according ASTM-D6866; and a glass content of 10% or greater. The article has the following characteristics: at least one side with a thickness of at least 8 mm; a UL flame rating of at least HB at 0.8 mm; and a gloss value of 89 or higher on at least one side of the article with a thickness of less than 0.8 mm.

In the various embodiments of the article: (i) the article has at least one side with a thickness of at least 0.3 mm, a UL flame rating of at least HB at 0.8 mm, and a gloss value of 89 or higher on at least one side with a thickness at least 0.3 mm; and/or (ii) the thickness is 0.3 mm to 0.8 mm; and/or (iii) the thickness is 0.3 mm to 0.5 mm; and/or (iv) the article is metalized; and/or (v) the metalized article is formed by vapor deposition; and/or (vi) the article is an electrical component, a medical device component, or a component of a meter system; and/or (vii) the electric component is part of a cell phone, a camera, a video recorder, an electronic tablet, a hand receiver, or a kitchen appliance; and/or (viii) the article comprises an overmolding; and/or (ix) the overmolding comprises any of the above identified composition; and/or (x) the overmolding is over a metal frame the metal frame comprises aluminum, tin, cobalt, stainless steel, iron, silver, gold, or platinum; and/or (xi) the metal frame comprises aluminum, tin, cobalt, iron, or stainless steel; and/or (xii) the article has a biocontent of at least 5 weight % based upon a total weight of resin in the article and excluding the glass, fillers, and additives, determined according ASTM-D6866.

In an embodiment, an article of manufacture is produced by the process comprising: (a) providing a blended composition comprising (i) one or more polyester-polycarbonates wherein at least one of the polyester-polycarbonates has at least some structural units derived from sebacic acid; (ii) a glass content of 25% or greater; and (iii) an epoxy; (b) melting the blended composition of (a) 250 to 310° C. in an extruder; (c) extruding the blended composition of step (b); (d) isolating the blended composition, wherein the isolated blended composition has a glass transition temperature 130° C. to 147° C., and a melt flow rate of greater than 12 g/10 minutes at 300° C./1.2 kg according to ASTM-D; and (e) forming the article form the isolated blended composition.

Optionally, the process can further comprising: (i) (f) drying the blended composition of (d) prior to forming an article; and (g) forming the article by molding the dry blended composition in an injection molder to form the article, wherein the article has at least one side with a thickness equal to or less than 0.8 mm, a UL flame rating of at least HB at 0.8 mm, and a gloss of 89 or higher at 60° on at least one side of the article with a thickness of equal to or less than 0.8 mm; and/or (ii) the article is injection molded at a temperature of 260° C. to 320° C.

The invention claimed is:

1. A composition comprising:
A polymer component comprising one or more polycarbonates wherein at least one of the polycarbonates is a polyester-polycarbonate having at least one unit derived from sebacic acid and a biocontent of at least 5 weight % based upon a total weight of the polyester-polycarbonate, determined according ASTM-D6866;
a glass present in an amount of 10 to 50 weight % based upon a total weight of the composition; and
an epoxy resin present in an amount of 0.01 to 10 weight % based on total weight of the polymer component;
wherein at least one polyester-polycarbonate has: (a) a weight average molecular weight of 30,000 to 45,000 Daltons as measured by gel permeation chromatography using BPA polycarbonate standards, and a sebacic acid content of 7.0 mole % to 12.0 mole %; or (b) a weight average molecular weight of 15,000 to 28,000 Daltons as measured by gel permeation chromatography using BPA polycarbonate standards, and a sebacic acid content of 3.0 mole % to 7.0 mole %;
wherein the composition has a melt volume rate of greater than 10.5 cm$^3$/10 minutes at 300° C./1.2 kg according to ASTM-D1238-10, and
wherein a part molded having a 0.8 mm thickness molded from the composition has a gloss value of 89 or higher at 60°, according to ASTM-D523.

2. The composition of claim 1, wherein the at least one polyester-polycarbonate has: (a) a weight average molecular weight of 34,000 to 39,000 Daltons as measured by gel permeation chromatography using BPA polycarbonate standards, and a sebacic acid content of 7.0 mole % to 9.0 mole %; or (b) a weight average molecular weight of 19,000 to 23,000 Daltons as measured by gel permeation chromatography using BPA polycarbonate standards, and a sebacic acid content of 5.0 mole % to 7.0 mole %.

3. The composition of claim 2, wherein the at least one polyester-polycarbonate has a weight average molecular weight of 35,000 to 38,000 Daltons as measured by gel permeation chromatography using BPA polycarbonate standards, and a sebacic acid content of 7.75 mole % to 8.75 mole %.

4. The composition of claim 2, wherein the at least one polyester-polycarbonate has a weight average molecular weight of 20,000 to 22,000 Daltons as measured by gel permeation chromatography using BPA polycarbonate standards, and a sebacic acid content of 5.5 mole % to 6.5 mole %.

5. The composition of claim 1, wherein the glass is present in an amount from 10 to 40 weight % based on a total weight of the composition.

6. The composition of claim 1, wherein the glass is present in an amount from 25 to 35 weight % based on a total weight of the composition.

7. The composition of claim 1, wherein the glass is present in an amount from 29 to 31 weight % based on a total weight of the composition.

8. The composition of claim 1, wherein the glass is chopped glass or fiber glass.

9. The composition of claim 1, wherein the glass transition temperature of the at least one polyester polycarbonate is 130° C. to 147° C.

10. The composition of claim 9, wherein the epoxy resin is an epoxy-functional styrene-(meth)acrylate copolymer with glycidyl groups.

11. The composition of claim 1, wherein the glass transition temperature of the at least one polyester polycarbonate is 133° C. to 137° C.

12. The composition of claim 1, wherein the epoxy resin is a hydrolytic stabilizer.

13. The composition of claim 1, wherein the epoxy resin has multiple epoxy groups.

14. The composition of claim 1, further comprising one or more additives of heat stabilizers, mold release agents, impact modifiers, UV stabilizers, flame retardants, antistatic agents, anti-drip agents, blowing agents, radiation stabilizers, and colorants.

15. The composition of claim 1, wherein the at least one polyester-polycarbonate comprises one or more of:
less than 100 ppm sebacic acid monomer impurity,
less than 4 ppm triethylamine impurity,
less than 10 ppm methylene chloride impurity, and
less than 100 ppb carbon tetrachloride impurity.

16. The composition of claim 1, wherein the at least one polyester-polycarbonate comprises less than 1 mole % anhydride linkages.

17. The composition of claim 1, wherein an article molded from the composition having a 0.8 mm thickness exhibits a 15% or greater improvement in gloss at 60° according to ASTM-D523 compared with an article molded from BPA polycarbonate having the same glass loading and thickness, and molded using the same molding conditions.

18. The composition of claim 1, wherein a 0.8 mm thickness article molded from the composition using a double gated tensile bar mold exhibits a 15% or greater improvement in Tensile Elongation at Break at the knit line of the molded article compared with an article molded from BPA polycarbonate having the same glass loading and thickness, and molded using the same molding conditions.

19. The composition of claim 1, wherein a 0.8 mm thickness article molded from the composition using a double gated tensile bar mold exhibits a 10% or greater improvement in Tensile Strength at the knit line of the molded article compared with an article molded from BPA polycarbonate having the same glass loading and thickness, and molded using the same molding conditions.

20. An article formed by injection molding the composition of claim 1, wherein the article has the following characteristics:
at least one side with a thickness of 0.8 mm or less;
a UL flame rating of at least HB at 0.8 mm; and
a gloss value of 89 or higher at 60° on at least one side of the article with a thickness of less than 0.8 mm.

21. The article of claim 20, wherein the article is metalized.

22. The article of claim 21, wherein the article is metalized by vapor deposition.

23. The article of claim 21, wherein the article is an electrical component, a medical device component or component of a meter system.

24. The article of claim 23, wherein the electrical component is part of a cell phone, a camera, a video recorder, an electronic tablet, a hand receiver, or a kitchen appliance.

25. The article of claim 20, wherein the article is an electrical component, a medical device component or a component of a meter system.

26. The article of claim 25, wherein the electrical component is part of a cell phone, a camera, a video recorder, an electronic tablet, a hand receiver, or a kitchen appliance.

27. The article of claim 20 formed by overmolding the composition.

28. The article of claim 27, wherein the overmolding is over a metal frame.

29. The article of claim 28, wherein the metal frame comprises at least one metal of aluminum, tin, cobalt, iron, and stainless steel.

30. An article formed by injection molding the composition of claim 1, wherein the article has the following characteristics:
at least one side with a thickness of at least 0.3 mm,
a UL flame rating of at least HB at 0.8 mm; and
a gloss value of 89 or higher at 60° on at least one side with a thickness of at least 0.3 mm.

31. The article of claim 30, having at least one side with a thickness of 0.3 mm to 0.8 mm.

32. The article of claim 31, having at least one side with a thickness of 0.3 mm to 0.5 mm.

33. The article of claim 30, wherein the article is metalized.

34. The article of claim 33, wherein the article is metalized by vapor deposition.

35. The article of claim 33, wherein the article is an electrical component, a medical device component or a component of a meter system.

36. The article of claim 35, wherein the electrical component is part of a cell phone, a camera, a video recorder, an electronic tablet, a hand receiver, or a kitchen appliance.

37. The article of claim 30, wherein the article is an electrical component, a medical device component or a component of a meter system.

38. The article of claim 37, wherein the electrical component is part of a cell phone, a camera, a video recorder, an electronic tablet, a and receiver, or a kitchen appliance.

39. The article of claim 30, formed by overmolding the composition.

40. The article of claim 39, wherein the overmolding is over a metal frame.

41. The article of claim 40, wherein the metal frame comprises at least one metal of aluminum, tin, cobalt, stainless steel, iron, silver, gold, and platinum.

42. An article of manufacture produced by a process comprising:
(a) providing the composition of claim 1
(b) melting the composition at a temperature of 250 to 310° C. in an extruder;
(c) extruding the melted composition;
(d) isolating the extruded composition, wherein the isolated extruded composition has a glass transition temperature of 130° C. to 147° C., and a melt flow rate of greater than 12 g/10 minutes at 300° C./1.2 kg according to ASTM-D; and
(e) forming the article from the isolated extruded composition.

43. The article of claim 42, wherein the process further comprises:
(f) drying the isolated extruded composition prior to forming the article; and
the forming of e) is accomplished by molding the dry isolated extruded composition in an injection molder,
wherein the article has at least one side with a thickness equal to or less than 0.8 mm, a UL flame rating of at least HB at 0.8 mm, and a gloss of 89 or higher at 60° on at least one side of the article with a thickness of equal to or less than 0.8 mm.

44. The article of claim 43, wherein the dry isolated extruded composition is injection molded at a temperature of 260° C. to 320° C.

45. A composition comprising:
a polymer component comprising two or more polyester-polycarbonates derived from bisphenol A and sebacic acid, and having a biocontent of at least 5 weight % based upon a total weight of the polyester-polycarbonate, determined according ASTM-D6866;
glass present in an amount of 10 to 50 weight % based on a total weight of the composition; and
an epoxy resin present in an amount of 0.01 to 10 weight % based on a total weight of the polymer component;
wherein at least one polyester-polycarbonate has: (a) a weight average molecular weight of 30,000 to 45,000 Daltons as measured by gel permeation chromatography using BPA polycarbonate standards, and a sebacic acid content of 7.0 mole % to 12.0 mole %; or (b) a weight average molecular weight of 15,000 to 28,000 Daltons as measured by gel permeation chromatography using BPA polycarbonate standards, and a sebacic acid content of 3.0 mole % to 7.0 mole %;
wherein the composition has a melt volume rate of greater than 10.5 cm$^3$/10 minutes at 300° C./1.2 kg according to ASTM-D1238-10, and
wherein a part molded having a 0.8 mm thickness molded from the composition has a gloss value of 89 or higher at 60°, according to ASTM-D523.

46. The composition of claim 45, wherein the at least one polyester-polycarbonate has: (a) a weight average molecular weight of 34,000 to 39,000 Daltons as measured by gel permeation chromatography using BPA polycarbonate standards, and a sebacic acid content of 7.0 mole % to 9.0 mole %; or (b) a weight average molecular weight of 19,000 to 23,00 Daltons as measured by gel permeation chromatography using BPA polycarbonate standards, and a sebacic acid content of 5.0 mole % to 7.0 mole %.

47. The composition of claim 46, wherein the at least one polyester-polycarbonate has a weight average molecular weight of 36,500 Daltons as measured by gel permeation chromatography using BPA polycarbonate standards and has a sebacic acid content of 8.25 mole %.

48. The composition of claim 46, wherein the at least one polyester-polycarbonate has a weight average molecular weight of 21,500 Daltons as measured by gel permeation chromatography using BPA polycarbonate standards and has a sebacic acid content of 6.0 mole %.

49. The composition of claim 45, wherein the glass is present in an amount of 10 to 40 weight % based on a total weight of the total composition.

50. The composition of claim 45, wherein the glass is present in an amount of 25 to 35 weight % based on a total weight of the total composition.

51. The composition of claim 45, wherein the glass is present in an amount of 29 to 31 weight % based on a total weight of the total composition.

52. The composition of claim 45, wherein the glass is chopped glass or fiber glass.

53. The composition of claim 45, wherein at least one polyester-polycarbonate has: (a) a weight average molecular weight of 30,000 to 45,000 Daltons as measured by gel permeation chromatography using BPA polycarbonate standards, and a sebacic acid content of 7.0 mole % to 12.0 mole % sebacic acid; and at least one polyester-polycarbonate has: (b) a weight average molecular weight of 15,000 to 28,000 Daltons as measured by gel permeation chromatography using BPA polycarbonate standards, and a sebacic acid content of 3.0 mole % to 7.0 mole %.

54. A composition comprising:
a polymer component comprising one or more polyester-polycarbonates wherein at least one polyester-polycarbonate is derived from sebacic acid and bisphenol A, and has a biocontent of at least 5 weight % based upon a total weight of the polyester-polycarbonate, determined according ASTM-D6866;
glass present in an amount of 10 to 40 weight % based on a total weight of the composition; and
an epoxy resin present in an amount of 0.01 to 10 weight % based on a total weight of the polymer component, wherein the epoxy resin is an epoxy-functional styrene-(meth)acrylate copolymer with glycidyl groups;
wherein the at least one polyester-polycarbonate has (a) a weight average molecular weight of 34,000 to 39,000 Daltons as measured by gel permeation chromatography using BPA polycarbonate standards and a sebacic acid content of 7.0 mole % to 9.0 mole %; or (b) a weight average molecular weight of 19,000 to 23,000 Daltons as measured by gel permeation chromatography using BPA polycarbonate standards, and a sebacic acid content of 5.0 mole % to 7.0 mole %;
wherein the glass transition temperature of the composition is 130° C. to 147° C.;
wherein the composition has a melt volume rate of greater than 10.5 cm$^3$/10 minutes at 300° C./1.2 kg according to ASTM-D1238-10; and
wherein a part molded having a 0.8 mm thickness molded from the composition has a gloss value of 89 or higher at 60°, according to ASTM-D523.

55. The composition of claim 54, wherein the glass is fiber glass or chopped glass.

56. The composition of claim 55, wherein the fiber glass diameter is 6 to 17 micrometers.

57. The composition of claim 54, wherein the glass contains less than 100 parts per million boron.

* * * * *